United States Patent
Wang et al.

(10) Patent No.: US 10,853,675 B2
(45) Date of Patent: Dec. 1, 2020

(54) DRIVING STATE MONITORING METHODS AND APPARATUSES, DRIVER MONITORING SYSTEMS, AND VEHICLES

(71) Applicant: Beijing SenseTime Technology Development Co., Ltd., Beijing (CN)

(72) Inventors: Fei Wang, Beijing (CN); Chen Qian, Beijing (CN)

(73) Assignee: Beijing SenseTime Technology Development Co., Ltd., Beijing (CN)

(*) Notice: Subject to any disclaimer, the term of this patent is extended or adjusted under 35 U.S.C. 154(b) by 111 days.

(21) Appl. No.: 16/177,198

(22) Filed: Oct. 31, 2018

(65) Prior Publication Data

US 2019/0065873 A1 Feb. 28, 2019

Related U.S. Application Data

(63) Continuation of application No. PCT/CN2018/084526, filed on Apr. 25, 2018, which is a continuation of application No. PCT/CN2017/096957, filed on Aug. 10, 2017.

(51) Int. Cl.
*G06K 9/00* (2006.01)

(52) U.S. Cl.
CPC ..... *G06K 9/00845* (2013.01); *G06K 9/00268* (2013.01); *G06K 9/00281* (2013.01); *G06K 9/00355* (2013.01)

(58) Field of Classification Search
None
See application file for complete search history.

(56) References Cited

U.S. PATENT DOCUMENTS

| 7,253,739 | B2 | 8/2007 | Hammoud et al. |
| 10,289,938 | B1* | 5/2019 | Flowers ............. G06K 9/00208 |
| 10,322,728 | B1* | 6/2019 | Porikli ............... G06K 9/00845 |
| 10,614,726 | B2* | 4/2020 | Harkness ............ G09B 7/00 |

(Continued)

FOREIGN PATENT DOCUMENTS

| CN | 101030316 A | 9/2007 |
| CN | 101540090 A | 9/2009 |

(Continued)

OTHER PUBLICATIONS

European Patent Application No. 18845078.7, Extended Search and Opinion dated Jul. 21, 2020, 8 pages.

(Continued)

*Primary Examiner* — Shervin K Nakhjavan
(74) *Attorney, Agent, or Firm* — Lathrop GPM LLP

(57) ABSTRACT

Embodiments of the present application disclose driving state monitoring methods and apparatuses, driver monitoring systems, and vehicles. The driving state monitoring method includes: performing driver state detection on a driver image; and performing at least one of: outputting a driving state monitoring result of a driver or performing intelligent driving control based on a result of the driver state detection. The embodiments of the present application can implement real-time monitoring of the driving state of a driver, so as to take corresponding measures in time when the driving state of the driver is poor, to ensure safe driving and avoid road traffic accidents.

27 Claims, 4 Drawing Sheets

(56) References Cited

U.S. PATENT DOCUMENTS

| | | | | |
|---|---|---|---|---|
| 2003/0163233 | A1* | 8/2003 | Song | G07C 5/085 701/31.4 |
| 2003/0181822 | A1* | 9/2003 | Victor | A61B 5/11 600/558 |
| 2005/0231342 | A1 | 10/2005 | Kim | |
| 2005/0273264 | A1* | 12/2005 | Gern | B60W 50/14 701/301 |
| 2006/0072792 | A1 | 4/2006 | Toda et al. | |
| 2007/0041552 | A1* | 2/2007 | Moscato | H04M 1/6075 379/214.01 |
| 2011/0224875 | A1* | 9/2011 | Cuddihy | B60W 10/18 701/42 |
| 2011/0235919 | A1 | 9/2011 | Morita et al. | |
| 2012/0219189 | A1 | 8/2012 | Wu et al. | |
| 2012/0231773 | A1* | 9/2012 | Lipovski | H04M 19/044 455/414.1 |
| 2012/0269405 | A1 | 10/2012 | Kaneda et al. | |
| 2013/0073114 | A1* | 3/2013 | Nemat-Nasser | B60W 40/09 701/1 |
| 2013/0275899 | A1* | 10/2013 | Schubert | G06F 3/0481 715/765 |
| 2014/0055569 | A1 | 2/2014 | Jeon et al. | |
| 2014/0139655 | A1* | 5/2014 | Mimar | G08B 21/0476 348/77 |
| 2014/0204193 | A1* | 7/2014 | Zhang | G06K 9/00597 348/78 |
| 2014/0272811 | A1* | 9/2014 | Palan | H04W 4/44 434/66 |
| 2015/0106007 | A1 | 4/2015 | Matsumura | |
| 2015/0131857 | A1* | 5/2015 | Han | G06K 9/00845 382/103 |
| 2015/0186714 | A1 | 7/2015 | Ren et al. | |
| 2015/0310758 | A1* | 10/2015 | Daddona | G09B 9/02 434/62 |
| 2016/0001785 | A1* | 1/2016 | Hsu | B60K 35/00 701/36 |
| 2016/0046298 | A1* | 2/2016 | DeRuyck | B60W 50/14 340/576 |
| 2016/0101784 | A1* | 4/2016 | Olson | B60K 37/06 340/576 |
| 2016/0187879 | A1 | 6/2016 | Mere et al. | |
| 2016/0355190 | A1 | 12/2016 | Omi | |
| 2018/0012090 | A1* | 1/2018 | Herbst | G06K 9/6212 |
| 2018/0126901 | A1* | 5/2018 | Levkova | G06K 9/00597 |
| 2019/0056732 | A1* | 2/2019 | Aoi | B60W 50/082 |
| 2019/0122525 | A1* | 4/2019 | Lancelle | G08B 21/06 |
| 2019/0130761 | A1* | 5/2019 | Rau | B60W 40/09 |
| 2019/0143815 | A1* | 5/2019 | Sato | B60K 35/00 340/439 |
| 2019/0213429 | A1* | 7/2019 | Sicconi | G06K 9/00335 |
| 2019/0370577 | A1* | 12/2019 | Meng | G06K 9/00228 |
| 2019/0370578 | A1* | 12/2019 | Meng | G06T 7/73 |
| 2019/0370580 | A1* | 12/2019 | Aoi | A61B 5/4809 |
| 2019/0377933 | A1* | 12/2019 | Hara | A61B 5/004 |

FOREIGN PATENT DOCUMENTS

| | | |
|---|---|---|
| CN | 104408879 A | 3/2015 |
| CN | 105139583 A | 12/2015 |
| CN | 204915314 U | 12/2015 |
| CN | 105654753 A | 6/2016 |
| CN | 106585629 A | 4/2017 |
| JP | AH04-68500 | 3/1992 |
| JP | H10-181380 A | 7/1998 |
| JP | 2000102510 A | 4/2000 |
| JP | 2003-131785 | 5/2003 |
| JP | 2007-237919 | 9/2007 |
| JP | 2008302741 A | 12/2008 |
| JP | 2014-48760 | 3/2014 |
| JP | 2015-133050 | 7/2015 |

OTHER PUBLICATIONS

Gonçalves et al. (2015) "Driver State Monitoring Systems—Transferable knowledge manual driving to HAD," Procedia Manufacturing, 3, pp. 3011-3016.

Ji et al. (2004) "Real-Time Nonintrusive Monitoring and Prediction of Driver Fatigue," IEEE Transactions on Vehicular Technology, Vol. 53, No. 4, 17 pages.

Kaplan et al. (2015) "Driver Behavior Analysis for Safe Driving: A Survey," 2015 IEEE Transactions on Intelligent Transportation Systems, 16 pages.

Veeraraghavan et al. (2007) "Classifiers for driver activity monitoring," Transportation Research Part C 15, pp. 51-67.

* cited by examiner

DRIVING STATE MONITORING METHODS AND APPARATUSES, DRIVER MONITORING SYSTEMS, AND VEHICLES

CROSS-REFERENCE TO RELATED APPLICATIONS

This application is a continuation of PCT/CN 2018/084526, filed on Apr. 25, 2018, and entitled "Driving State Monitoring Methods and Apparatuses, Driver Monitoring Systems, and Vehicles," which is a continuation of PCT/CN 2017/096957, filed on Aug. 10, 2017. The contents of each of the aforementioned patent applications are hereby incorporated by reference in their entirety.

The present application relates to computer vision technologies, and in particular, to driving state monitoring methods and apparatuses, driver monitoring systems, and vehicles.

BACKGROUND

A driver's driving state has very serious impact on safe driving, and therefore, the driver should be in a good driving state as far as possible. If the driver diverts attention to other things, such as a mobile phone, during driving because of concerns about the other things, such as the mobile phone, the driver may not be able to learn about the road situation in time.

A poor driving state of the driver may lead to a decline in judgment ability, or even mind wandering or transient memory loss, resulting in unsafe factors such as delayed or premature driving action, unscheduled operation or improper correction time, and thus, road traffic accidents are very likely to occur.

SUMMARY

Embodiments of the present application provide a technical solution of driving state monitoring.

A driving state monitoring method provided according to one aspect of the embodiments of the present application includes: performing driver state detection on a driver image; and performing at least one of: outputting a driving state monitoring result of a driver or performing intelligent driving control based on a result of the driver state detection.

Optionally, in the embodiments of the driving state monitoring method, the driver state detection includes at least one of: driver fatigue state detection, driver distraction state detection, or driver scheduled distraction action detection.

Optionally, in the embodiments of the driving state monitoring method, the performing driver fatigue state detection on a driver image includes: detecting at least part of a face region of the driver in the driver image to obtain state information of the at least part of the face region, the state information of the at least part of the face region including at least one of: eye open/closed state information or mouth open/closed state information; obtaining a parameter value of an index for representing a driver fatigue state based on the state information of the at least part of the face region within a period of time; and determining a result of the driver fatigue state detection based on the parameter value of the index for representing the driver fatigue state.

Optionally, in the embodiments of the driving state monitoring method, the index for representing the driver fatigue state includes at least one of: an eye closure degree or a yawning degree.

Optionally, in the embodiments of the driving state monitoring method, the parameter value of the eye closure degree includes at least one of: a number of eye closures, an eye closure frequency, eye closure duration, eye closure amplitude, a number of eye semi-closures, or an eye semi-closure frequency; or the parameter value of the yawning degree includes at least one of: a yawning state, a number of yawns, yawning duration, or a yawning frequency.

Optionally, in the embodiments of the driving state monitoring method, the performing driver distraction state detection on a driver image includes: performing at least one of face orientation or gaze direction detection on the driver in the driver image to obtain at least one of face orientation information or gaze direction information; determining a parameter value of an index for representing a driver distraction state based on at least one of the face orientation information or the gaze direction information within a period of time, the index for representing the driver distraction state includes at least one of: a face orientation deviation degree or a gaze deviation degree; and determining a result of the driver distraction state detection based on the parameter value of the index for representing the driver distraction state.

Optionally, in the embodiments of the driving state monitoring method, the parameter value of the face orientation deviation degree includes at least one of: a number of head turns, head turning duration, or a head turning frequency; or the parameter value of the gaze deviation degree includes at least one of: a gaze direction deviation angle, gaze direction deviation duration, or a gaze direction deviation frequency.

Optionally, in the embodiments of the driving state monitoring method, the performing at least one of face orientation or gaze direction detection on the driver image includes: detecting face key points of the driver image; and performing at least one of face orientation or gaze direction detection based on the face key points.

Optionally, in the embodiments of the driving state monitoring method, the performing face orientation detection based on the face key points to obtain the face orientation information includes: obtaining feature information of head pose based on the face key points; and determining the face orientation information based on the feature information of the head pose.

Optionally, in the embodiments of the driving state monitoring method, the obtaining feature information of head pose based on the face key points, and determining the face orientation information based on the feature information of the head pose include: extracting the feature information of the head pose via a first neural network based on the face key points; and performing face orientation estimation via a second neural network based on the feature information of the head pose to obtain the face orientation information.

Optionally, in the embodiments of the driving state monitoring method, the performing gaze direction detection based on the face key points to obtain the gaze direction information includes: determining a pupil edge location based on an eye image positioned by an eye key point among the face key points, and computing a pupil center location based on the pupil edge location; and computing the gaze direction information based on the pupil center location and an eye center location.

Optionally, in the embodiments of the driving state monitoring method, the determining a pupil edge location based on an eye image positioned by an eye key point among the face key points includes: detecting, based on a third neural network, a pupil edge location of an eye region image among images divided based on the face key points, and obtaining the pupil edge location based on information outputted by the third neural network.

Optionally, in the embodiments of the driving state monitoring method, the scheduled distraction action includes at least one of: a smoking action, a drinking action, an eating action, a phone call action, or an entertainment action.

Optionally, in the embodiments of the driving state monitoring method, the performing scheduled distraction action detection on a driver image includes: performing target object detection corresponding to the scheduled distraction action on the driver image to obtain a detection frame for a target object; and determining whether the scheduled distraction action occurs based on the detection frame for the target object.

Optionally, in the embodiments, the driving state monitoring method further includes: if the distraction action occurs, obtaining a determination result indicating whether the scheduled distraction action occurs within a period of time to obtain a parameter value of an index for representing a distraction degree; and determining the result of the driver scheduled distraction action detection based on the parameter value of the index for representing the distraction degree.

Optionally, in the embodiments of the driving state monitoring method, the parameter value of the distraction degree includes at least one of: a number of occurrences of the scheduled distraction action, duration of the scheduled distraction action, or a frequency of the scheduled distraction action.

Optionally, in the embodiments of the driving state monitoring method, when the scheduled distraction action is the smoking action, the performing target object detection corresponding to the scheduled distraction action on the driver image to obtain a detection frame for a target object, and the determining whether the scheduled distraction action occurs based on the detection frame for the target object include: performing face detection on the driver image via a fourth neural network to obtain a face detection frame, and extracting feature information of the face detection frame; and determining whether the smoking action occurs via the fourth neural network based on the feature information of the face detection frame.

Optionally, in the embodiments of the driving state monitoring method, when the scheduled distraction action is the eating action/drinking action/phone call action/entertainment action, the performing target object detection corresponding to the scheduled distraction action on the driver image to obtain a detection frame for a target object, and the determining whether the scheduled distraction action occurs based on the detection frame for the target object include: performing preset target object detection corresponding to the eating action/drinking action/phone call action/entertainment action on the driver image via a fifth neural network to obtain a detection frame for a preset target object; the preset target object including: hands, mouth, eyes, or a target item; and the target item including at least one of following types: containers, foods, or electronic devices; and determining a detection result of the distraction action based on the detection frame for the preset target object; the detection result of the distraction action including one of: no eating action/drinking action/phone call action/entertainment action occurs, the eating action occurs, the drinking action occurs, the phone call action occurs, or the entertainment action occurs.

Optionally, in the embodiments of the driving state monitoring method, the determining a detection result of the distraction action based on the detection frame for the preset target object includes: determining the detection result of the scheduled distraction action based on whether a detection frame for the hands, a detection frame for the mouth, a detection frame for the eyes, or a detection frame for the target item are detected, whether the detection frame for the hands overlaps the detection frame for the target item, a type of the target item, and whether a distance between the detection frame for the target item and the detection frame for the mouth or the detection frame for the eyes satisfies preset conditions.

Optionally, in the embodiments of the driving state monitoring method, the determining the detection result of the distraction action based on whether the detection frame for the hands overlaps the detection frame for the target object, and whether a location relationship between the detection frame for the target object and the detection frame for the mouth or the detection frame for the eyes satisfies preset conditions includes: if the detection frame for the hands overlaps the detection frame for the target item, the type of the target item is a container or food, and the detection frame for the target item overlaps the detection frame for the mouth, determining that the eating action or the drinking action occurs; or if the detection frame for the hands overlaps the detection frame for the target item, the type of the target item is an electronic device, and the minimum distance between the detection frame for the target item and the detection frame for the mouth is less than a first preset distance, or the minimum distance between the detection frame for the target item and the detection frame for the eyes is less than a second preset distance, determining that the entertainment action or the phone call action occurs.

Optionally, in the embodiments, the driving state monitoring method further includes: if the detection frame for the hands, the detection frame for the mouth, and the detection frame for any one target item are not detected simultaneously, and the detection frame for the hands, the detection frame for the eyes, and the detection frame for any one target item are not detected simultaneously, determining that the detection result of the distraction action is that no eating action, drinking action, phone call action and entertainment action is detected; or if the detection frame for the hands does not overlap the detection frame for the target item, determining that the detection result of the distraction action is that no eating action, drinking action, phone call action, and entertainment action is detected; or if the type of the target item is a container or food and the detection frame for the target item does not overlaps the detection frame for the mouth, or the type of the target item is an electronic device and the minimum distance between the detection frame for the target item and the detection frame for the mouth is not less than the first preset distance, or the minimum distance between the detection frame for the target item and the detection frame for the eyes is not less than the second preset distance, determining that the detection result of the distraction action is that no eating action, drinking action, phone call action, and entertainment action is detected.

Optionally, in the embodiments, the driving state monitoring method further includes: if the result of the driver scheduled distraction action detection is that a scheduled distraction action is detected, prompting the detected distraction action.

Optionally, in the embodiments, the driving state monitoring method further includes: outputting distraction prompt information based on at least one of the result of the driver distraction state detection or the result of the driver scheduled distraction action detection.

Optionally, in the embodiments of the driving state monitoring method, the outputting a driving state monitoring result of a driver based on the result of the driver state detection includes: determining a driving state level according to a preset condition that the result of the driver fatigue state detection, the result of the driver distraction state detection, and the result of the driver scheduled distraction action detection satisfy; and using the determined driving state level as the driving state monitoring result.

Optionally, in the embodiments, the driving state monitoring method further includes: performing a control operation corresponding to the driving state monitoring result.

Optionally, in the embodiments of the driving state monitoring method, the performing a control operation corresponding to the driving state monitoring result includes at least one of: if the determined driving state monitoring result satisfies a predetermined prompting/warning condition, outputting prompting/warning information corresponding to the predetermined prompting/warning condition; or if the determined driving state monitoring result satisfies a predetermined driving mode switching condition, switching a driving mode to an automatic driving mode.

Optionally, in the embodiments, the driving state monitoring method further includes: performing facial recognition on the driver image; and performing authentication control based on the result of the facial recognition.

Optionally, in the embodiments of the driving state monitoring method, the performing facial recognition on the driver image includes: performing face detection on the driver image via a sixth neural network, and performing feature extraction on the detected face to obtain a face feature; performing face matching between the face feature and face feature templates in a database; and if a face feature template matching the face feature exists in the database, outputting identity information corresponding to the face feature template matching the face feature.

Optionally, in the embodiments, the driving state monitoring method further includes: if no face feature template matching the face feature exists in the database, prompting the driver to register; in response to receiving a registration request from the driver, performing face detection on the collected driver image via the sixth neural network, and performing feature extraction on the detected face to obtain a face feature; and establishing user information of the driver in the database by using the face feature as the face feature template of the driver, the user information including the face feature template of the driver and the identity information inputted by the driver.

Optionally, in the embodiments, the driving state monitoring method further includes: storing the driving state monitoring result in the user information of the driver in the database.

Optionally, in the embodiments, the driving state monitoring method further includes: performing image collection using an infrared camera to obtain the driver image.

Optionally, in the embodiments of the driving state monitoring method, the performing image collection using an infrared camera includes: performing image collection using the infrared camera deployed in at least one location within a vehicle.

Optionally, in the embodiments of the driving state monitoring method, the at least one location includes at least one of the following locations: a location above or near a dashboard, a location above or near a center console, an A-pillar or nearby location, or a rear-view mirror or nearby location.

Optionally, in the embodiments, the driving state monitoring method further includes: performing driver gesture detection based on the driver image; and generating a control instruction based on a result of the driver gesture detection.

Optionally, in the embodiments of the driving state monitoring method, the performing driver gesture detection based on the driver image includes: detecting a hand key point in a driver image of a current frame; and using a static gesture determined based on the detected hand key point as the result of the driver gesture detection.

Optionally, in the embodiments of the driving state monitoring method, the performing driver gesture detection based on the driver image includes: detecting hand key points of a plurality of driver image frames in a driver video; and using a dynamic gesture determined based on the detected hand key points of the plurality of driver image frames as the result of the driver gesture detection.

A driving state monitoring apparatus provided according to another aspect of the embodiments of the present application includes: a state detection module, configured to perform driver state detection on a driver image; and at least one of: an output module, configured to output a driving state monitoring result of a driver based on a result of the driver state detection, or an intelligent driving control module, configured to perform intelligent driving control based on the result of the driver state detection.

Optionally, in the embodiments of the driving state monitoring apparatus, the driver state detection includes at least one of: driver fatigue state detection, driver distraction state detection, or driver scheduled distraction action detection.

Optionally, in the embodiments of the driving state monitoring apparatus, the state detection module is configured, when performing driver fatigue state detection on the driver image, to: detect at least part of a face region of the driver in the driver image to obtain state information of the at least part of the face region, the state information of the at least part of the face region including at least one of: eye open/closed state information or mouth open/closed state information; obtain a parameter value of an index for representing a driver fatigue state based on the state information of the at least part of the face region within a period of time; and determine a result of the driver fatigue state detection based on the parameter value of the index for representing the driver fatigue state.

Optionally, in the embodiments of the driving state monitoring apparatus, the index for representing the driver fatigue state includes at least one of: an eye closure degree or a yawning degree.

Optionally, in the embodiments of the driving state monitoring apparatus, the parameter value of the eye closure degree includes at least one of: a number of eye closures, an eye closure frequency, eye closure duration, eye closure amplitude, a number of eye semi-closures, or an eye semi-closure frequency; or the parameter value of the yawning degree includes at least one of: a yawning state, a number of yawns, yawning duration, or a yawning frequency.

Optionally, in the embodiments of the driving state monitoring apparatus, the state detection module is configured, when performing driver distraction state detection on the driver image, to: perform at least one of face orientation or gaze direction detection on the driver in the driver image to obtain at least one of face orientation information or gaze direction information; determine a parameter value of an index for representing a driver distraction state based on at least one of the face orientation information or the gaze direction information within a period of time, the index for representing the driver distraction state includes at least one of: a face orientation deviation degree or a gaze deviation degree; and determine a result of the driver distraction state detection based on the parameter value of the index for representing the driver distraction state.

Optionally, in the embodiments of the driving state monitoring apparatus, the parameter value of the face orientation deviation degree includes at least one of: a number of head turns, head turning duration, or a head turning frequency; or the parameter value of the gaze deviation degree includes at least one of: a gaze direction deviation angle, gaze direction deviation duration, or a gaze direction deviation frequency.

Optionally, in the embodiments of the driving state monitoring apparatus, the state detection module is configured, when performing at least one of face orientation or gaze direction detection on the driver image, to: detect face key points of the driver image; and perform at least one of face orientation or gaze direction detection based on the face key points.

Optionally, in the embodiments of the driving state monitoring apparatus, the state detection module is configured, when performing face orientation detection based on the face key points, to: obtain feature information of head pose based on the face key points; and determine the face orientation information based on the feature information of the head pose.

Optionally, in the embodiments of the driving state monitoring apparatus, the state detection module is configured, when obtaining the feature information of the head pose based on the face key points and determining the face orientation information based on the feature information of the head pose, to: extract the feature information of the head pose via a first neural network based on the face key points; and perform face orientation estimation via a second neural network based on the feature information of the head pose to obtain the face orientation information.

Optionally, in the embodiments of the driving state monitoring apparatus, the state detection module is configured, when performing gaze direction detection based on the face key points, to: determine a pupil edge location based on an eye image positioned by an eye key point among the face key points, and compute a pupil center location based on the pupil edge location; and compute the gaze direction information based on the pupil center location and an eye center location.

Optionally, in the embodiments of the driving state monitoring apparatus, the state detection module is configured, when determining the pupil edge location based on the eye image positioned by the eye key point among the face key points, to: detect, based on a third neural network, a pupil edge location of an eye region image among images divided based on the face key points, and obtain the pupil edge location based on information outputted by the third neural network.

Optionally, in the embodiments of the driving state monitoring apparatus, the scheduled distraction action includes at least one of: a smoking action, a drinking action, an eating action, a phone call action, or an entertainment action.

Optionally, in the embodiments of the driving state monitoring apparatus, the state detection module is configured, when performing scheduled distraction action detection on the driver image, to: perform target object detection corresponding to the scheduled distraction action on the driver image to obtain a detection frame for a target object; and determine whether the scheduled distraction action occurs based on the detection frame for the target object.

Optionally, in the embodiments of the driving state monitoring apparatus, the state detection module is further configured to: if the scheduled distraction action occurs, obtain a determination result indicating whether the scheduled distraction action occurs within a period of time, and obtain the parameter value of the index for representing the distraction degree; and determine the result of the driver scheduled distraction action detection based on the parameter value of the index for representing the distraction degree.

Optionally, in the embodiments of the driving state monitoring apparatus, the parameter value of the distraction degree includes at least one of: a number of occurrences of the scheduled distraction action, duration of the scheduled distraction action, or a frequency of the scheduled distraction action.

Optionally, in the embodiments of the driving state monitoring apparatus, when the scheduled distraction action is the smoking action, the state detection module is configured, when performing scheduled distraction action detection on the driver image, to: perform face detection on the driver image via a fourth neural network to obtain a face detection frame, and extract feature information of the face detection frame; and determine whether the smoking action occurs via the fourth neural network based on the feature information of the face detection frame.

Optionally, in the embodiments of the driving state monitoring apparatus, when the scheduled distraction action is the eating action/drinking action/phone call action/entertainment action, the state detection module is configured, when performing scheduled distraction action on the driver image, to: perform preset target object detection corresponding to the eating action/drinking action/phone call action/entertainment action on the driver image via a fifth neural network to obtain a detection frame for a preset target object; the preset target object including: hands, mouth, eyes, or a target item; and the target item including at least one of following types: containers, foods, or electronic devices; and determining a detection result of the distraction action based on the detection frame for the preset target object; the detection result of the distraction action including one of: no eating action/ drinking action/phone call action/entertainment action occurs, the eating action occurs, the drinking action occurs, the phone call action occurs, or the entertainment action occurs.

Optionally, in the embodiments of the driving state monitoring apparatus, the state detection module is configured, when determining the detection result of the distraction action based on the detection frame for the preset target object, to: determine the detection result of the scheduled distraction action based on whether a detection frame for the hands, a detection frame for the mouth, a detection frame for the eyes, and a detection frame for the target item are detected, whether the detection frame for the hands overlaps the detection frame for the target item, a type of the target item, and whether a distance between the detection frame for the target item and the detection frame for the mouth or the detection frame for the eyes satisfies preset conditions.

Optionally, in the embodiments of the driving state monitoring apparatus, the state detection module is configured, when determining the detection result of the distraction action based on whether the detection frame for the hands overlaps the detection frame for the target item, and whether a location relationship between the detection frame for the target item and the detection frame for the mouth or the detection frame for the eyes satisfies preset conditions, to: if the detection frame for the hands overlaps the detection frame for the target item, the type of the target item is a container or food, and the detection frame for the target item overlaps the detection frame for the mouth, determine that the eating action or the drinking action occurs; or if the detection frame for the hands overlaps the detection frame for the target item, the type of the target item is an electronic device, and the minimum distance between the detection frame for the target item and the detection frame for the mouth is less than a first preset distance, or the minimum distance between the detection frame for the target item and the detection frame for the eyes is less than a second preset distance, determine that the entertainment action or the phone call action occurs.

Optionally, in the embodiments of the driving state monitoring apparatus, the state detection module is further configured to: if the detection frame for the hands, the detection frame for the mouth, and the detection frame for any one target item are not detected simultaneously, and the detection frame for the hands, the detection frame for the eyes, and the detection frame for any one target item are not detected simultaneously, determine that the detection result of the distraction action is that no eating action, drinking action, phone call action and entertainment action is detected; or if the detection frame for the hands does not overlap the detection frame for the target item, determine that the detection result of the distraction action is that no eating action, drinking action, phone call action, and entertainment action is detected; or if the type of the target item is a container or food and the detection frame for the target item does not overlaps the detection frame for the mouth, or the type of the target item is an electronic device and the minimum distance between the detection frame for the target item and the detection frame for the mouth is not less than the first preset distance, or the minimum distance between the detection frame for the target item and the detection frame for the eyes is not less than the second preset distance, determine that the detection result of the distraction action is that no eating action, drinking action, phone call action, and entertainment action is detected.

Optionally, in the embodiments, the driving state monitoring apparatus further includes: a first prompting module, configured to prompt, if the result of the driver scheduled distraction action detection is that a scheduled distraction action is detected, the detected distraction action.

Optionally, in the embodiments, the driving state monitoring apparatus further includes: a second prompting module, configured to output distraction prompt information based on at least one of the result of the driver distraction state detection or the result of the driver scheduled distraction action detection.

Optionally, in the embodiments of the driving state monitoring apparatus, the output module is configured, when outputting the driving state monitoring result of the driver based on the result of the driver state detection, to: determine a driving state level according to a preset condition that the result of the driver fatigue state detection, the result of the driver distraction state detection, and the result of the driver scheduled distraction action detection satisfy; and use the determined driving state level as the driving state monitoring result.

Optionally, in the embodiments, the driving state monitoring apparatus further includes: a first control module, configured to perform a control operation corresponding to the driving state monitoring result.

Optionally, in the embodiments of the driving state monitoring apparatus, the first control module is configured to: if the determined driving state monitoring result satisfies a predetermined prompting/warning condition, output prompting/warning information corresponding to the predetermined prompting/warning condition; or if the determined driving state monitoring result satisfies a predetermined driving mode switching condition, switch a driving mode to an automatic driving mode.

Optionally, in the embodiments, the driving state monitoring apparatus further includes: a facial recognition module, configured to perform facial recognition on the driver image; and a second control module, configured to perform authentication control based on a result of the facial recognition.

Optionally, in the embodiments of the driving state monitoring apparatus, the facial recognition module is configured to: perform face detection on the driver image via a sixth neural network, and perform feature extraction on the detected face to obtain a face feature; perform face matching between the face feature and face feature templates in a database; and if a face feature template matching the face feature exists in the database, output identity information corresponding to the face feature template corresponding to the face feature.

Optionally, in the embodiments of the driving state monitoring apparatus, the second control module is further configured to: if no face feature template matching the face feature exists in the database, prompt the driver to register; and establish user information of the driver in the database by using the face feature sent by the facial recognition module as the face feature template of the driver, the user information including the face feature template of the driver and the identity information inputted by the driver; the facial recognition module is further configured to, in response to receiving a registration request from the driver, perform face detection on the collected driver image via the sixth neural network, perform feature extraction on the detected face to obtain the face feature, and send the face feature to the second control module.

Optionally, in the embodiments of the driving state monitoring apparatus, the output module is further configured to store the driving state monitoring result in the user information of the driver in the database.

Optionally, in the embodiments, the driving state monitoring apparatus further includes: at least one infrared camera, correspondingly deployed in at least one location within a vehicle, and configured to perform image collection to obtain the driver image.

Optionally, in the embodiments of the driving state monitoring apparatus, the at least one location includes at least one of the following locations: a location above or near a dashboard, a location above or near a center console, an A-pillar or nearby location, or a rear-view mirror or nearby location.

Optionally, in the embodiments, the driving state monitoring apparatus further includes: a gesture detection module, configured to perform driver gesture detection based on the driver image; and an instruction generation module, configured to generate a control instruction based on a result of the driver gesture detection.

Optionally, in the embodiments of the driving state monitoring apparatus, the gesture detection module is configured to: detect a hand key point in a driver image of a current frame; and use a static gesture determined based on the detected hand key point as the result of the driver gesture detection.

Optionally, in the embodiments of the driving state monitoring apparatus, the gesture detection module is configured to: detect hand key points of a plurality of driver image frames in a driver video; and use a dynamic gesture determined based on the detected hand key points of the plurality of driver image frames as the result of the driver gesture detection.

A driver monitoring system provided according to still another aspect of the embodiments of the present application includes: a display module, configured to display a driver image and a driving state monitoring result of a driver; and a driver state detection module, configured to perform driver state detection on the driver image, and output the driving state monitoring result of the driver based on a result of the driver state detection; the driver state detection including at least one of: driver fatigue state detection, driver distraction state detection, or driver scheduled distraction action detection.

Optionally, in the embodiments of the driver monitoring system, the display module includes: a first display region, configured to display the driver image and prompting/warning information corresponding to the driving state monitoring result; and a second display region, configured to display a scheduled distraction action.

Optionally, in the embodiments of the driver monitoring system, the driver state detection module is further configured to perform facial recognition on the driver image; the first display region is further configured to display a result of the facial recognition.

Optionally, in the embodiments of the driver monitoring system, the driver state detection module is further configured to perform driver gesture detection based on the driver image; the display module further includes: a third display region, configured to display a result of the gesture detection, the result of the gesture detection including a static gesture or a dynamic gesture.

An electronic device provided according to yet another aspect of the embodiments of the present application includes: a memory, configured to store a computer program; and a processor, configured to execute the compute program stored in the memory, and implement the driving state monitoring method according to any of the foregoing embodiments of the present application when the computer program is executed.

A computer readable storage medium provided according to yet another aspect of the embodiments of the present application has a computer program stored thereon, where when the computer program is executed by a processor, the driving state monitoring method according to any of the foregoing embodiments of the present application is implemented.

A computer program provided according to yet another aspect of the embodiments of the present application includes computer instructions, where when the computer instructions run in a processor of a device, the driving state monitoring method according to any of the foregoing embodiments of the present application is implemented A vehicle provided according to yet another aspect of the embodiments of the present application includes a central control system, and further includes: the driving state monitoring apparatus according to any of the foregoing embodiments of the present application, or the driver monitoring system according to any of the foregoing embodiments of the present application.

Optionally, in the embodiments of the vehicle, the central control system is configured to: perform intelligent driving control based on the result of driver state detection outputted by the driving state monitoring apparatus or the driver monitoring system; or switch a driving mode to an automatic driving mode when the driving state monitoring result outputted by the driving state monitoring apparatus or the driver monitoring system satisfies a predetermined driving mode switching condition, and perform automatic driving control on the vehicle in the automatic driving mode; or invoke, when the driving state monitoring result satisfies the preset predetermined prompting/warning condition, an entertainment system in the vehicle or an entertainment system external to the vehicle to output prompting/warning information corresponding to the predetermined prompting/warning condition.

Optionally, in the embodiments of the vehicle, the central control system is further configured to correspondingly control the vehicle based on a control instruction generated based on the result of the gesture detection outputted by the driving state monitoring apparatus or the driver monitoring system.

Optionally, in the embodiments of the vehicle, the central control system is further configured to switch the driving mode to a manual driving mode when a driving instruction for switching to manual driving is received.

Optionally, in the embodiments, the vehicle further includes: an entertainment system, configured to output the prompting/warning information corresponding to the predetermined prompting/warning condition according to the control instruction of the central control system; or adjust the pre-warning effect of the prompting/warning information or the playing effect of entertainment according to the control instruction of the central control system.

Optionally, in the embodiments, the vehicle further includes: at least one infrared camera, configured to perform image collection.

Optionally, in the embodiments of the vehicle, the infrared camera is deployed in at least one location within the vehicle, and the at least one location includes at least one of the following locations: a location above or near a dashboard, a location above or near a center console, an A-pillar or nearby location, or a rear-view mirror or nearby location.

In yet another aspect, disclosed is a driving state monitoring apparatus, comprising: a processor; and a memory storing instructions, the instructions when executed by the processor, cause the processor to perform operations, the operations comprising: performing driver state detection on a driver image; and performing at least one of: outputting a driving state monitoring result of a driver based on a result of the driver state detection or performing intelligent driving control based on the result of the driver state detection; wherein the driver state detection comprises at least one of: driver fatigue state detection, driver distraction state detection, or driver scheduled distraction action detection.

In one embodiment, the performing driver fatigue state detection on a driver image includes: detecting at least part of a face region of the driver in the driver image to obtain state information of the at least part of the face region, the state information of the at least part of the face region comprising at least one of: eye open/closed state information or mouth open/closed state information; obtaining a parameter value of an index for representing a driver fatigue state based on the state information of the at least part of the face region within a period of time; and determining a result of the driver fatigue state detection based on the parameter value of the index for representing the driver fatigue state.

In one embodiment, the index for representing the driver fatigue state includes at least one of: an eye closure degree or a yawning degree.

In one embodiment, the parameter value of the eye closure degree includes at least one of: a number of eye closures, an eye closure frequency, eye closure duration, eye closure amplitude, a number of eye semi-closures, or an eye semi-closure frequency; or the parameter value of the yawning degree comprises at least one of: a yawning state, a number of yawns, yawning duration, or a yawning frequency.

In one embodiment, the performing driver distraction state detection on a driver image includes: performing at least one of face orientation or gaze direction detection on the driver in the driver image to obtain at least one of face orientation information or gaze direction information; determining a parameter value of an index for representing a driver distraction state based on at least one of the face orientation information or the gaze direction information within a period of time, the index for representing the driver distraction state includes at least one of: a face orientation deviation degree or a gaze deviation degree; and determining a result of the driver distraction state detection based on the parameter value of the index for representing the driver distraction state.

In one embodiment, the parameter value of the face orientation deviation degree includes at least one of: a number of head turns, head turning duration, or a head turning frequency; or the parameter value of the gaze deviation degree includes at least one of: a gaze direction deviation angle, gaze direction deviation duration, or a gaze direction deviation frequency.

In one embodiment, the performing at least one of face orientation or gaze direction detection on the driver image includes: detecting face key points of the driver image; and performing at least one of face orientation or gaze direction detection based on the face key points.

In one embodiment, the performing face orientation detection based on the face key points to obtain the face orientation information includes: obtaining feature information of head pose based on the face key points; and determining the face orientation information based on the feature information of the head pose.

In one embodiment, the obtaining feature information of head pose based on the face key points, and determining the face orientation information based on the feature information of the head pose include: extracting the feature information of the head pose via a first neural network based on the face key points; and performing face orientation estimation via a second neural network based on the feature information of the head pose to obtain the face orientation information.

In one embodiment, the performing gaze direction detection based on the face key points to obtain the gaze direction information includes: determining a pupil edge location based on an eye image positioned by an eye key point among the face key points, and computing a pupil center location based on the pupil edge location; and computing the gaze direction information based on the pupil center location and an eye center location.

In one embodiment, the determining a pupil edge location based on an eye image positioned by an eye key point among the face key points includes: detecting, based on a third neural network, a pupil edge location of an eye region image among images divided based on the face key points, and obtaining the pupil edge location based on information outputted by the third neural network.

In one embodiment, the scheduled distraction action includes at least one of: a smoking action, a drinking action, an eating action, a phone call action, or an entertainment action.

In one embodiment, the performing scheduled distraction action detection on a driver image includes: performing target object detection corresponding to the scheduled distraction action on the driver image to obtain a detection frame for a target object; and determining whether the scheduled distraction action occurs based on the detection frame for the target object.

In one embodiment, the operations further include: if the distraction action occurs, obtaining a determination result indicating whether the scheduled distraction action occurs within a period of time to obtain a parameter value of an index for representing a distraction degree; and determining the result of the driver scheduled distraction action detection based on the parameter value of the index for representing the distraction degree.

In one embodiment, the parameter value of the distraction degree includes at least one of: a number of occurrences of the scheduled distraction action, duration of the scheduled distraction action, or a frequency of the scheduled distraction action.

In one embodiment, when the scheduled distraction action is the smoking action, the performing target object detection corresponding to the scheduled distraction action on the driver image to obtain a detection frame for a target object, and the determining whether the scheduled distraction action occurs based on the detection frame for the target object include: performing face detection on the driver image via a fourth neural network to obtain a face detection frame, and extracting feature information of the face detection frame; and determining whether the smoking action occurs via the fourth neural network based on the feature information of the face detection frame.

In one embodiment, when the scheduled distraction action is the eating action/drinking action/phone call action/entertainment action, the performing target object detection corresponding to the scheduled distraction action on the driver image to obtain a detection frame for a target object, and the determining whether the scheduled distraction action occurs based on the detection frame for the target object include: performing preset target object detection corresponding to the eating action/drinking action/phone call action/entertainment action on the driver image via a fifth neural network to obtain a detection frame for a preset target object; the preset target object including: hands, mouth, eyes, or a target item; and the target item including at least one of following types: containers, foods, or electronic devices; and determining a detection result of the distraction action based on the detection frame for the preset target object; the detection result of the distraction action including one of: no eating action/drinking action/phone call action/entertainment action occurs, the eating action occurs, the drinking action occurs, the phone call action occurs, or the entertainment action occurs.

In one embodiment, the determining a detection result of the distraction action based on the detection frame for the preset target object includes: determining the detection result of the scheduled distraction action based on whether a detection frame for the hands, a detection frame for the mouth, a detection frame for the eyes, or a detection frame for the target item are detected, whether the detection frame for the hands overlaps the detection frame for the target item, a type of the target item, and whether a distance between the detection frame for the target item and the detection frame for the mouth or the detection frame for the eyes satisfies preset conditions.

In one embodiment, the determining the detection result of the distraction action based on whether the detection frame for the hands overlaps the detection frame for the target object, and whether a location relationship between the detection frame for the target object and the detection frame for the mouth or the detection frame for the eyes satisfies preset conditions includes: if the detection frame for the hands overlaps the detection frame for the target item, the type of the target item is a container or food, and the detection frame for the target item overlaps the detection frame for the mouth, determining that the eating action or the drinking action occurs; or if the detection frame for the hands overlaps the detection frame for the target item, the type of the target item is an electronic device, and the minimum distance between the detection frame for the target item and the detection frame for the mouth is less than a first preset distance, or the minimum distance between the detection frame for the target item and the detection frame for the eyes is less than a second preset distance, determining that the entertainment action or the phone call action occurs.

In one embodiment, the operations further include: if the detection frame for the hands, the detection frame for the mouth, and the detection frame for any one target item are not detected simultaneously, and the detection frame for the hands, the detection frame for the eyes, and the detection frame for any one target item are not detected simultaneously, determining that the detection result of the distraction action is that no eating action, drinking action, phone call action and entertainment action is detected; or if the detection frame for the hands does not overlap the detection frame for the target item, determining that the detection result of the distraction action is that no eating action, drinking action, phone call action, and entertainment action is detected; or if the type of the target item is a container or food and the detection frame for the target item does not overlaps the detection frame for the mouth, or the type of the target item is an electronic device and the minimum distance between the detection frame for the target item and the detection frame for the mouth is not less than the first preset distance, or the minimum distance between the detection frame for the target item and the detection frame for the eyes is not less than the second preset distance, determining that the detection result of the distraction action is that no eating action, drinking action, phone call action, and entertainment action is detected.

In one embodiment, the operations further include: if the result of the driver scheduled distraction action detection is that a scheduled distraction action is detected, prompting the detected distraction action.

In one embodiment, the operations further include: outputting distraction prompt information based on at least one of the result of the driver distraction state detection or the result of the driver scheduled distraction action detection.

In one embodiment, the outputting a driving state monitoring result of a driver based on the result of the driver state detection includes: determining a driving state level according to a preset condition that the result of the driver fatigue state detection, the result of the driver distraction state detection, and the result of the driver scheduled distraction action detection satisfy; and using the determined driving state level as the driving state monitoring result.

In one embodiment, the operations further include: performing a control operation corresponding to the driving state monitoring result.

In one embodiment, the performing a control operation corresponding to the driving state monitoring result includes at least one of: if the determined driving state monitoring result satisfies a predetermined prompting/warning condition, outputting prompting/warning information corresponding to the predetermined prompting/warning condition; or if the determined driving state monitoring result satisfies a predetermined driving mode switching condition, switching a driving mode to an automatic driving mode.

In one embodiment, the operations further include: performing facial recognition on the driver image; and performing authentication control based on the result of the facial recognition.

In one embodiment, the performing facial recognition on the driver image includes: performing face detection on the driver image via a sixth neural network, and performing feature extraction on the detected face to obtain a face feature; performing face matching between the face feature and face feature templates in a database; and if a face feature template matching the face feature exists in the database, outputting identity information corresponding to the face feature template matching the face feature.

In one embodiment, the operations further include: if no face feature template matching the face feature exists in the database, prompting the driver to register; in response to receiving a registration request from the driver, performing face detection on the collected driver image via the sixth neural network, and performing feature extraction on the detected face to obtain a face feature; and establishing user information of the driver in the database by using the face feature as the face feature template of the driver, the user information including the face feature template of the driver and the identity information inputted by the driver.

In one embodiment, the operations further include: storing the driving state monitoring result in the user information of the driver in the database.

In one embodiment, the operations further include: performing image collection using an infrared camera to obtain the driver image.

In one embodiment, the performing image collection using an infrared camera includes: performing image collection using the infrared camera deployed in at least one location within a vehicle.

In one embodiment, the at least one location includes at least one of the following locations: a location above or near a dashboard, a location above or near a center console, an A-pillar or nearby location, or a rear-view mirror or nearby location.

In one embodiment, the operations further include: performing driver gesture detection based on the driver image; and generating a control instruction based on a result of the driver gesture detection.

In one embodiment, the performing driver gesture detection based on the driver image includes: detecting a hand key point in a driver image of a current frame; and using a static gesture determined based on the detected hand key point as the result of the driver gesture detection.

In one embodiment, the performing driver gesture detection based on the driver image includes: detecting hand key points of a plurality of driver image frames in a driver video; and using a dynamic gesture determined based on the detected hand key points of the plurality of driver image frames as the result of the driver gesture detection.

In yet another aspect, disclosed is a non-transitory computer readable storage medium having a computer program stored thereon, wherein the computer program when executed by a processor, causes the processor to perform operations, the operations comprising: performing driver state detection on a driver image; and performing at least one of: outputting a driving state monitoring result of a driver based on a result of the driver state detection or performing intelligent driving control based on the result of the driver state detection; wherein the driver state detection comprises at least one of: driver fatigue state detection, driver distraction state detection, or driver scheduled distraction action detection.

In one embodiment, the performing driver fatigue state detection on a driver image includes: detecting at least part of a face region of the driver in the driver image to obtain state information of the at least part of the face region, the state information of the at least part of the face region comprising at least one of: eye open/closed state information or mouth open/closed state information; obtaining a parameter value of an index for representing a driver fatigue state based on the state information of the at least part of the face region within a period of time; and determining a result of the driver fatigue state detection based on the parameter value of the index for representing the driver fatigue state.

In one embodiment, the index for representing the driver fatigue state includes at least one of: an eye closure degree or a yawning degree.

In one embodiment, the parameter value of the eye closure degree includes at least one of: a number of eye closures, an eye closure frequency, eye closure duration, eye closure amplitude, a number of eye semi-closures, or an eye semi-closure frequency; or the parameter value of the yawning degree comprises at least one of: a yawning state, a number of yawns, yawning duration, or a yawning frequency.

In one embodiment, the performing driver distraction state detection on a driver image includes: performing at least one of face orientation or gaze direction detection on the driver in the driver image to obtain at least one of face orientation information or gaze direction information; determining a parameter value of an index for representing a driver distraction state based on at least one of the face orientation information or the gaze direction information within a period of time, the index for representing the driver distraction state includes at least one of: a face orientation deviation degree or a gaze deviation degree; and determining a result of the driver distraction state detection based on the parameter value of the index for representing the driver distraction state.

In one embodiment, the parameter value of the face orientation deviation degree includes at least one of: a number of head turns, head turning duration, or a head turning frequency; or the parameter value of the gaze deviation degree includes at least one of: a gaze direction deviation angle, gaze direction deviation duration, or a gaze direction deviation frequency.

In one embodiment, the performing at least one of face orientation or gaze direction detection on the driver image includes: detecting face key points of the driver image; and performing at least one of face orientation or gaze direction detection based on the face key points.

In one embodiment, the performing face orientation detection based on the face key points to obtain the face orientation information includes: obtaining feature information of head pose based on the face key points; and determining the face orientation information based on the feature information of the head pose.

In one embodiment, the obtaining feature information of head pose based on the face key points, and determining the face orientation information based on the feature information of the head pose include: extracting the feature information of the head pose via a first neural network based on the face key points; and performing face orientation estimation via a second neural network based on the feature information of the head pose to obtain the face orientation information.

In one embodiment, the performing gaze direction detection based on the face key points to obtain the gaze direction information includes: determining a pupil edge location based on an eye image positioned by an eye key point among the face key points, and computing a pupil center location based on the pupil edge location; and computing the gaze direction information based on the pupil center location and an eye center location.

In one embodiment, the determining a pupil edge location based on an eye image positioned by an eye key point among the face key points includes: detecting, based on a third neural network, a pupil edge location of an eye region image among images divided based on the face key points, and obtaining the pupil edge location based on information outputted by the third neural network.

In one embodiment, the scheduled distraction action includes at least one of: a smoking action, a drinking action, an eating action, a phone call action, or an entertainment action.

In one embodiment, the performing scheduled distraction action detection on a driver image includes: performing target object detection corresponding to the scheduled distraction action on the driver image to obtain a detection frame for a target object; and determining whether the scheduled distraction action occurs based on the detection frame for the target object.

In one embodiment, the operations further include: if the distraction action occurs, obtaining a determination result indicating whether the scheduled distraction action occurs within a period of time to obtain a parameter value of an index for representing a distraction degree; and determining the result of the driver scheduled distraction action detection based on the parameter value of the index for representing the distraction degree.

In one embodiment, the parameter value of the distraction degree includes at least one of: a number of occurrences of the scheduled distraction action, duration of the scheduled distraction action, or a frequency of the scheduled distraction action.

In one embodiment, when the scheduled distraction action is the smoking action, the performing target object detection corresponding to the scheduled distraction action on the driver image to obtain a detection frame for a target object, and the determining whether the scheduled distraction action occurs based on the detection frame for the target object include: performing face detection on the driver image via a fourth neural network to obtain a face detection frame, and extracting feature information of the face detection frame; and determining whether the smoking action occurs via the fourth neural network based on the feature information of the face detection frame.

In one embodiment, when the scheduled distraction action is the eating action/drinking action/phone call action/entertainment action, the performing target object detection corresponding to the scheduled distraction action on the driver image to obtain a detection frame for a target object, and the determining whether the scheduled distraction action occurs based on the detection frame for the target object include: performing preset target object detection corresponding to the eating action/drinking action/phone call action/entertainment action on the driver image via a fifth neural network to obtain a detection frame for a preset target object; the preset target object including: hands, mouth, eyes, or a target item; and the target item including at least one of following types: containers, foods, or electronic devices; and determining a detection result of the distraction action based on the detection frame for the preset target object; the detection result of the distraction action including one of: no eating action/ drinking action/phone call action/entertainment action occurs, the eating action occurs, the drinking action occurs, the phone call action occurs, or the entertainment action occurs.

In one embodiment, the determining a detection result of the distraction action based on the detection frame for the preset target object includes: determining the detection result of the scheduled distraction action based on whether a detection frame for the hands, a detection frame for the mouth, a detection frame for the eyes, or a detection frame for the target item are detected, whether the detection frame for the hands overlaps the detection frame for the target item, a type of the target item, and whether a distance between the detection frame for the target item and the detection frame for the mouth or the detection frame for the eyes satisfies preset conditions.

In one embodiment, the determining the detection result of the distraction action based on whether the detection frame for the hands overlaps the detection frame for the target object, and whether a location relationship between the detection frame for the target object and the detection frame for the mouth or the detection frame for the eyes satisfies preset conditions includes: if the detection frame for the hands overlaps the detection frame for the target item, the type of the target item is a container or food, and the detection frame for the target item overlaps the detection frame for the mouth, determining that the eating action or the drinking action occurs; or if the detection frame for the hands overlaps the detection frame for the target item, the type of the target item is an electronic device, and the minimum distance between the detection frame for the target item and the detection frame for the mouth is less than a first preset distance, or the minimum distance between the detection frame for the target item and the detection frame for the eyes is less than a second preset distance, determining that the entertainment action or the phone call action occurs.

In one embodiment, the operations further include: if the detection frame for the hands, the detection frame for the mouth, and the detection frame for any one target item are not detected simultaneously, and the detection frame for the hands, the detection frame for the eyes, and the detection frame for any one target item are not detected simultaneously, determining that the detection result of the distraction action is that no eating action, drinking action, phone call action and entertainment action is detected; or if the detection frame for the hands does not overlap the detection frame for the target item, determining that the detection result of the distraction action is that no eating action, drinking action, phone call action, and entertainment action is detected; or if the type of the target item is a container or food and the detection frame for the target item does not overlaps the detection frame for the mouth, or the type of the target item is an electronic device and the minimum distance between the detection frame for the target item and the detection frame for the mouth is not less than the first preset distance, or the minimum distance between the detection frame for the target item and the detection frame for the eyes is not less than the second preset distance, determining that the detection result of the distraction action is that no eating action, drinking action, phone call action, and entertainment action is detected.

In one embodiment, the operations further include: if the result of the driver scheduled distraction action detection is that a scheduled distraction action is detected, prompting the detected distraction action.

In one embodiment, the operations further include: outputting distraction prompt information based on at least one of the result of the driver distraction state detection or the result of the driver scheduled distraction action detection.

In one embodiment, the outputting a driving state monitoring result of a driver based on the result of the driver state detection includes: determining a driving state level according to a preset condition that the result of the driver fatigue state detection, the result of the driver distraction state detection, and the result of the driver scheduled distraction action detection satisfy; and using the determined driving state level as the driving state monitoring result.

In one embodiment, the operations further include: performing a control operation corresponding to the driving state monitoring result.

In one embodiment, the performing a control operation corresponding to the driving state monitoring result includes at least one of: if the determined driving state monitoring result satisfies a predetermined prompting/warning condition, outputting prompting/warning information corresponding to the predetermined prompting/warning condition; or if the determined driving state monitoring result satisfies a predetermined driving mode switching condition, switching a driving mode to an automatic driving mode.

In one embodiment, the operations further include: performing facial recognition on the driver image; and performing authentication control based on the result of the facial recognition.

In one embodiment, the performing facial recognition on the driver image includes: performing face detection on the driver image via a sixth neural network, and performing feature extraction on the detected face to obtain a face feature; performing face matching between the face feature and face feature templates in a database; and if a face feature template matching the face feature exists in the database, outputting identity information corresponding to the face feature template matching the face feature.

In one embodiment, the operations further include: if no face feature template matching the face feature exists in the database, prompting the driver to register; in response to receiving a registration request from the driver, performing face detection on the collected driver image via the sixth neural network, and performing feature extraction on the detected face to obtain a face feature; and establishing user information of the driver in the database by using the face feature as the face feature template of the driver, the user information including the face feature template of the driver and the identity information inputted by the driver.

In one embodiment, the operations further include: storing the driving state monitoring result in the user information of the driver in the database.

In one embodiment, the operations further include: performing image collection using an infrared camera to obtain the driver image.

In one embodiment, the performing image collection using an infrared camera includes: performing image collection using the infrared camera deployed in at least one location within a vehicle.

In one embodiment, the at least one location includes at least one of the following locations: a location above or near a dashboard, a location above or near a center console, an A-pillar or nearby location, or a rear-view mirror or nearby location.

In one embodiment, the operations further include: performing driver gesture detection based on the driver image; and generating a control instruction based on a result of the driver gesture detection.

In one embodiment, the performing driver gesture detection based on the driver image includes: detecting a hand key point in a driver image of a current frame; and using a static gesture determined based on the detected hand key point as the result of the driver gesture detection.

In one embodiment, the performing driver gesture detection based on the driver image includes: detecting hand key points of a plurality of driver image frames in a driver video; and using a dynamic gesture determined based on the detected hand key points of the plurality of driver image frames as the result of the driver gesture detection.

Based on the driving state monitoring methods and apparatuses, the driver monitoring systems, the vehicles, the electronic devices, the programs, and the mediums provided by the embodiments of the present application, driver state detection can be performed on a driver image, and a driving state monitoring result of a driver can be outputted based on the result of the driver state detection, to implement real-time monitoring of the driving state of the driver, so that corresponding measures are taken in time when the driving state of the driver is poor to ensure safe driving and avoid road traffic accidents.

The following further describes in detail the technical solutions of the present application with reference to the accompanying drawings and embodiments.

BRIEF DESCRIPTION OF THE DRAWINGS

The accompanying drawings constituting a part of the specification are used for describing embodiments of the present application and are intended to explain the principles of the present application together with the descriptions.

According to the following detailed descriptions, this application can be understood more clearly with reference to the accompanying drawings.

DETAILED DESCRIPTION

Figure 1:
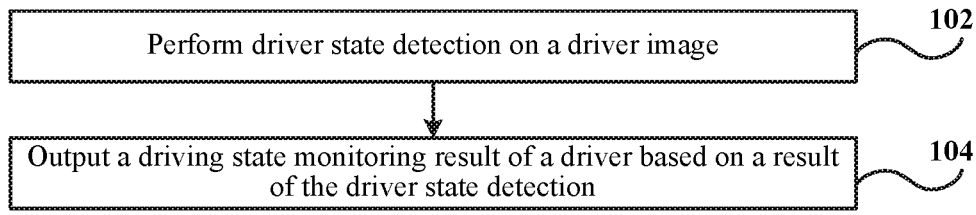
FIG. 1 is a flowchart of an embodiment of a driving state monitoring method according to the present application.

Various exemplary embodiments of the present application are now described in detail with reference to the accompanying drawings. It should be noted that, unless otherwise stated specifically, relative arrangement of the components and steps, the numerical expressions, and the values set forth in the embodiments are not intended to limit the scope of the present application.

In addition, it should be understood that, for ease of description, a size of each part shown in the accompanying drawings is not drawn in actual proportion.

The following descriptions of at least one exemplary embodiment are merely illustrative actually, and are not intended to limit the present application and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present application may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, or the like.

The electronic devices such as terminal devices, computer systems, and servers may be described in the general context of computer system executable instructions (for example, program modules) executed by the computer system. Generally, the program modules may include routines, programs, target programs, components, logics, data structures, or the like, to execute specific tasks or implement specific abstract data types. The computer system/server may be practiced in the distributed cloud computing environments in which tasks are executed by remote processing devices that are linked through a communications network. In the distributed computing environments, program modules may be located in local or remote computing system storage media including storage devices.

FIG. 1 is a flowchart of an embodiment of a driving state monitoring method according to the present application. The driving state monitoring method according to the embodiment of the present application may be implemented through an apparatus (called in the embodiment of the present application: a driving state monitoring apparatus) or a system (called in the embodiment of the present application: a driver monitoring system). As shown in FIG. 1, the driving state monitoring method of this embodiment includes the following.

102: Perform driver state detection on a driver image.

In an optional example, the operation 102 may be executed by a processor by invoking a corresponding instruction stored in a memory, or may be executed by a state detection module run by the processor.

104: Output a driving state monitoring result of a driver and/or perform intelligent driving control based on a result of the driver state detection.

In some of the embodiments, in the operation 104, the driving state monitoring result of the driver may be outputted based on the result of the driver state detection.

In some of the embodiments, in the operation 104, intelligent driving control may be performed on a vehicle based on the result of the driver state detection.

In some of the embodiments, in the operation 104, the driving state monitoring result of the driver may be outputted based on the result of the driver state detection, and meanwhile, intelligent driving control may be performed on a vehicle.

In some of the embodiments, in the operation 104, outputting the driving state monitoring result of the driver may include: locally outputting the driving state monitoring result and/or remotely outputting the driving state monitoring result. The locally outputting the driving state monitoring result refers to outputting the driving state monitoring result by the driving state monitoring apparatus or the driver monitoring system, or outputting the driving state monitoring result to a central control system in the vehicle so that intelligent driving control is performed on the vehicle based on the driving state monitoring result. The remotely outputting the driving state monitoring result, for example, may refer to sending the driving state monitoring result to a cloud server or a management node so that the cloud server or the management node collects, analyzes and/or manages the driving state monitoring result of the driver, or remotely controls the vehicle based on the driving state monitoring result.

In an optional example, the operation 104 may be executed by a processor by invoking a corresponding instruction stored in the memory, or may be executed by an output module and/or an intelligent driving control module run by the processor.

In an optional example, the foregoing operations 102-104 may be executed by a processor by invoking a corresponding instruction stored in the memory, or may be executed by a driver state detection control module run by the processor.

In some embodiments, the driver state detection, for example, may include, but is not limited to, at least one of: driver fatigue state detection, driver distraction state detection, or driver scheduled distraction action detection. Thus, the result of the driver state detection correspondingly includes, but is not limited to, at least one of: the result of the driver fatigue state detection, the result of the driver distraction state detection, or the result of the driver scheduled distraction action detection.

The scheduled distraction action in the embodiment of the present application may be any distraction action that may distract the driver, for example, a smoking action, a drinking action, an eating action, a phone call action, an entertainment action or the like. The eating action is eating food, for example, fruit, snacks or the like. The entertainment action is any action executed with the aid of an electronic device, for example, sending messages, playing games, singing or the like. The electronic device is for example a mobile terminal, a handheld computer, a game machine or the like.

Based on the driving state monitoring method provided in the foregoing embodiment of the present application, the driver state detection may be performed on the driver image, and the driving state monitoring result of the driver is outputted based on the result of the driver state detection, to implement real-time monitoring of the driving state of the driver, so that corresponding measures are taken in time when the driving state of the driver is poor to ensure safe driving and avoid road traffic accidents.

Figure 2:
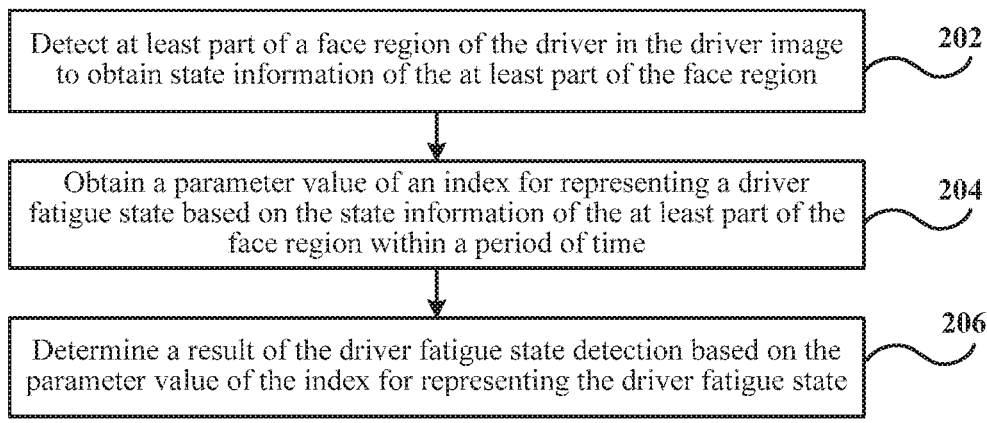
FIG. 2 is a flowchart of an embodiment of performing driver fatigue state detection on a driver image according to the embodiments of the present application.

FIG. 2 is a flowchart of an embodiment of performing driver fatigue state detection on a driver image according to embodiments of the present application. In an optional example, the embodiment shown in FIG. 2 may be executed by the processor by invoking a corresponding instruction stored in a memory, or may be executed by a state detection module run by the processor. As shown in FIG. 2, in some of the embodiments, the performing driver fatigue state detection on a driver image includes the following.

202: Detect at least part of a face region of the driver in the driver image to obtain state information of the at least part of the face region.

In an optional example, the foregoing at least part of the face region may include at least one of a driver's eye region, a driver's mouth region, or a driver's entire face region. The state information of the at least part of the face region may include at least one of: eye open/closed state information or mouth open/closed state information.

The foregoing eye open/closed state information may be used for detecting eye closure of the driver, for example, whether the driver's eyes are semi-closed ("semi-" represents the state that the eyes are not completely closed, for example, squinted in the sleepy state or the like), whether the driver's eyes are closed, the number of eye closures, the eye closure amplitude or the like. The eye open/closed state information may be optionally the information obtained by normalization processing of the amplitude of eye opening. The mouth open/closed state information may be used for yawn detection of the driver, for example, detecting whether the driver yawns, and the number of yawns or the like. The mouth open/closed state information may be optionally the information obtained by normalization processing of the amplitude of mouth opening.

In an optional example, face key points detection may be performed on the driver image, and computation is performed directly using an eye key point in the detected face key points, to obtain the eye open/closed state information based on the computing result.

In an optional example, the eyes in the driver image are first positioned using the eye key point among the face key points (for example, the coordinate information of the eye key point in the driver image) to obtain an eye image, and an upper eyelid line and a lower eyelid line are obtained using the eye image. The eye open/closed state information is obtained by computing the spacing between the upper eyelid line and the lower eyelid line.

In an optional example, computation is performed directly using a mouth key point in the face key points, so as to obtain the mouth open/closed state information based on the computing result.

In an optional example, the mouth in the driver image is first positioned using the mouth key point in the face key points (for example, the coordinate information of the mouth key point in the driver image) to obtain a mouth image through shearing, and an upper lip line and a lower lip line are obtained using the mouth image. The mouth open/closed state information is obtained by computing the spacing between the upper lip line and the lower lip line.

Operation 202 is executed on a plurality of driver image frames collected within a period of time to obtain the state information of at least part of a plurality of face regions within the period of time.

204: Obtain a parameter value of an index for representing a driver fatigue state based on the state information of the at least part of the face regions within a period of time.

In some optional examples, the index for representing the driver fatigue state for example may include, but are not limited to, at least one of: an eye closure degree or a yawning degree.

The parameter value of the eye closure degree for example may include, but are not limited to, at least one of: the number of eye closures, an eye closure frequency, eye closure duration, eye closure amplitude, the number of eye semi-closures, or eye semi-closure frequency; and/or the parameter value of the yawning degree for example may include, but are not limited to, at least one of: a yawning state, the number of yawns, yawning duration, or yawning frequency.

206: Determine a result of the driver fatigue state detection based on the parameter value of the index for representing the driver fatigue state.

The foregoing result of the driver fatigue state detection may include: no fatigue state is detected, or a fatigue driving state. Alternatively, the foregoing result of the driver fatigue state detection may also be a fatigue driving degree, where the fatigue driving degree may include: normal driving level (also called non-fatigue driving level) or fatigue driving level. The fatigue driving level may be one level, or may be divided into a plurality of different levels. For example, the foregoing fatigue driving level may be divided into fatigue driving prompt level (also called mild fatigue driving level) and fatigue driving warning level (also called severe fatigue driving level). Certainly, the fatigue driving degree may be divided into more levels, for example, mild fatigue driving level, moderate fatigue driving level, and severe fatigue driving level or the like. The present application does not limit different levels of the fatigue driving degree.

In an optional example, each level of the fatigue driving degree corresponds to a preset condition, and the level corresponding to the preset condition satisfied by the parameter value of the index for representing the driver fatigue state may be determined as the level of the fatigue driving degree.

In an optional example, the preset condition corresponding to the normal driving level (also called non-fatigue driving level) may include: condition 20a: no eye semi-closure and eye closure exist; and condition 20b: no yawning exists.

In the case that the foregoing conditions 20a and 20b are satisfied, the driver is in the normal driving level (also called non-fatigue driving level) at present.

In an optional example, the preset condition corresponding to the fatigue driving prompt level may include: condition 20c: eye semi-closure exists; and condition 20d: yawning exists.

In the case that any one of the foregoing conditions 20c and 20d is satisfied, the driver is in the fatigue driving prompt level at present.

In an optional example, the preset condition corresponding to the fatigue driving warning level may include: condition 20e: there are closed eyes, or the number of eye closures within a period of time reaches a preset number, or the duration of eye closure within a period of time reaches a preset duration; and condition 20f: the number of yawns within a period of time reaches a preset number.

In the case that any one of the foregoing conditions 20e and 20f is satisfied, the driver is in the fatigue driving warning level at present.

Figure 3:
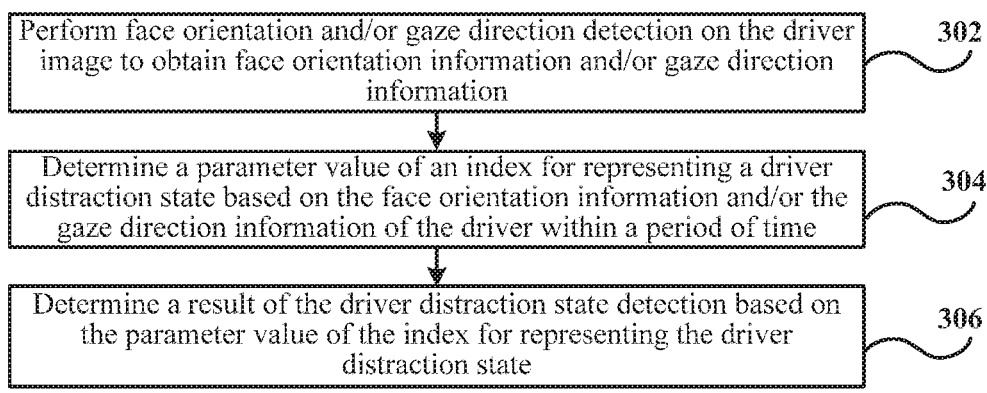
FIG. 3 is a flowchart of an embodiment of performing driver distraction state detection on a driver image according to the embodiments of the present application.

FIG. 3 is a flowchart of an embodiment of performing driver distraction state detection on a driver image according to the embodiments of the present application. In an optional example, the embodiment shown in FIG. 3 may be executed by the processor by invoking a corresponding instruction stored in a memory, or may be executed by a state detection module run by the processor. As shown in FIG. 3, in some of the embodiments, the performing driver distraction state detection on a driver image may include the following.

302: Perform face orientation and/or gaze direction detection on the driver image to obtain face orientation information and/or gaze direction information.

The face orientation information may be used for determining whether the face direction of the driver is normal, for example, determining whether the driver turns his/her face or turns around or the like. The face orientation information may be optionally an included angle between the front of the face of the driver and the front of the vehicle driven by the driver. The foregoing gaze direction information may be used for determining whether the gaze direction of the driver is normal, for example, determining whether the driver gazes ahead or the like. The gaze direction information may be used for determining whether the gaze of the driver deviates. The gaze direction information may be optionally an included angle between the gaze of the driver and the front of the vehicle driven by the driver.

304: Determine a parameter value of an index for representing a driver distraction state based on the face orientation information and/or the gaze direction information of the driver within a period of time.

The index for representing the driver distraction state for example may include, but are not limited to, at least one of: a face orientation deviation degree or a gaze deviation degree. In some of the optional examples, the parameter value of the face orientation deviation degree for example may include, but are not limited to, at least one of: the number of head turns, head turning duration, or head turning frequency; and/or the parameter value of the gaze deviation degree for example may include, but are not limited to, at least one of: a gaze direction deviation angle, gaze direction deviation duration, or gaze direction deviation frequency.

The foregoing gaze deviation degree for example may include: at least one of whether the gaze deviates, whether the gaze severely deviates or the like. The foregoing face orientation deviation degree (also called the face turning degree or the head turning degree) for example may include: at least one of whether the head turns, whether the head turns for a short time, and whether the head turns for a long time.

In an optional example, if it is determined that the face orientation information is larger than the first orientation, and the phenomenon of the face orientation information being larger than the first orientation continues for N1 frames (for example, continuing for 9 frames, 10 frames or the like), it is determined that the driver has experienced a long-time large-angle head turning, and the long-time large-angle head turning may be recorded, or the duration of this head turning may be recorded. If it is determined that the face orientation information is not larger than the first orientation but is larger than the second orientation, and the phenomenon of the face orientation information being not larger than the first orientation but larger than the second orientation continues for N1 frame (for example, lasting for 9 frames, 10 frames or the like), it is determined that the driver has experienced a long-time small-angle head turning, and the long-time small-angle head turning may be recorded, or the duration of this head turning may be recorded.

In an optional example, if it is determined that the included angle between the gaze direction information and the front of the vehicle is greater than a first included angle, and the phenomenon of the included angle being greater than the first included angle continues for N2 frame (for example, continuing for 8 frames, 9 frames or the like), it is determined that the driver has experienced a severe gaze deviation, and the severe gaze deviation may be recorded, or the duration of this severe gaze deviation may be recorded. If it is determined that the included angle between the gaze direction information and the front of the vehicle is not greater than a first included angle but is greater than a second included angle, and the phenomenon of the included angle being not greater than the first included angle but greater than the second included angle continues for N2 frame (for example, continuing for 9 frames, 10 frames or the like), it is determined that the driver has experienced a gaze deviation, and the gaze deviation may be recorded, or the duration of this gaze deviation may be recorded.

In an optional example, the values of the foregoing first orientation, second orientation, first included angle, second included angle, N1, and N2 may be set according to actual situations, and the present application does not limit the values.

306: Determine a result of the driver distraction state detection based on the parameter value of the index for representing the driver distraction state.

The result of the driver distraction state detection may include, for example, the driver concentrates (the driver's attention is not distracted), or the driver's attention is distracted. Alternatively, the result of the driver distraction state detection may be the driver distraction level, for example, the driver concentrates (the driver's attention is not distracted), the driver's attention is slightly distracted, the driver's attention is moderately distracted, the driver's attention is severely distracted or the like. The driver distraction level may be determined by a preset condition satisfied by the parameter value of the index for representing the driver distraction state. For example, if the gaze direction deviation angle and the face orientation deviation angle are both less than the first preset angle, the driver distraction level is the driver concentration. If either of the gaze direction deviation angle and the face orientation deviation angle is not less than the preset angle, and the duration is not greater than the first preset duration and less than the second preset duration, the driver's attention is slightly distracted. If either of the gaze direction deviation angle and the face orientation deviation angle is not less than the preset angle, and the duration is not greater than the second preset duration and less than the third preset duration, the driver's attention is moderately distracted. If either of the gaze direction deviation angle and the face orientation deviation angle is not less than the preset angle, and the duration is not less than the third preset duration, the driver's attention is severely distracted.

This embodiment determines the parameter value of the index for representing the driver distraction state by detecting the face orientation and/or gaze direction of the driver image, determines the result of the driver distraction state detection based on the parameter value to determine whether the driver concentrates on driving, and quantizes the driving concentration degree into at least one index of the gaze deviation degree and the head turning degree through quantization of the index for representing the driver distraction state, which is beneficial to evaluate the driving concentration state of the driver in time and objectively.

In some of the embodiments, the performing face orientation and/or gaze direction detection on the driver image in operation 302 may include: detecting face key points of the driver image; and performing face orientation and/or gaze direction detection based on the face key points.

Since the face key points generally contain feature information of head pose, in some of the optional examples, the performing face orientation detection based on the face key points to obtain the face orientation information includes: obtaining feature information of head pose based on the face key points; and determining the face orientation (also called head pose) information based on the feature information of the head pose. The face orientation information herein may represent, for example, the direction and angle of face turning, and the direction of the turning herein may be turning to the left, turning to the right, turning down, and/or turning up or the like.

In an optional example, whether the driver concentrates on driving can be determined through face orientation. The face orientation (head pose) may be represented as (yaw, pitch), where yaw and pitch separately represent a horizontal deflection angle (a yaw angle) and a vertical deflection angle (a pitch angle) of the head in the normalized spherical coordinates (a camera coordinate system where a camera is located). When the horizontal deflection angle and/or the vertical deflection angle is greater than a preset angle threshold, and the duration is greater than a preset duration threshold, it may be determined that the result of the driver distraction state detection is the driver's attention being distracted.

In an optional example, a corresponding neural network may be used to obtain the face orientation information of each driver image. For example, the foregoing detected face key points are inputted to a first neural network, the feature information of the head pose is extracted via the first neural network based on the received face key points and is inputted to a second neural network. Head pose estimation is performed via the second neural network based on the feature information of the head pose to obtain the face orientation information.

In the case of using a neural network, that is relatively mature and has good real-time characteristics, for extracting the feature information of the head pose, and a neural network for estimating the face orientation to obtain the face orientation information, for a video captured by the camera, the face orientation information corresponding to each image frame (i.e., each frame of the driver image) in the video can be detected accurately and in time, thus improving the accuracy of determining the driver's attention degree.

In some of the optional examples, the performing gaze direction detection based on face key points to obtain the gaze direction information includes: determining a pupil edge location based on an eye image positioned by an eye key point among the face key points, and computing a pupil center location based on the pupil edge location; and computing the gaze direction information based on the pupil center location and an eye center location, for example, computing a vector of the pupil center location to the eye center location in the eye image, the vector being the gaze direction information.

In an optional example, whether the driver concentrates on driving can be determined through the gaze direction. The gaze direction may be represented as (yaw, pitch), where yaw and pitch separately represent a horizontal deflection angle (a yaw angle) and a vertical deflection angle (a pitch angle) of the gaze in the normalized spherical coordinates (a camera coordinate system where a camera is located). When the horizontal deflection angle and/or the vertical deflection angle is greater than a preset angle threshold, and the duration is greater than a preset duration threshold, it may be determined that the result of the driver distraction state detection is the driver's attention being distracted.

The determining the pupil edge location based on an eye image positioned by an eye key point among the face key points may be implemented in the following approach: detecting, based on a third neural network, a pupil edge location of an eye region image among images divided based on the face key points, and obtaining the pupil edge location based on information outputted by the third neural network.

As an optional example, an eye image can be cut from the driver image and enlarged, and the cut and enlarged eye image is provided to the third neural network for pupil positioning to detect a pupil key point and output the detected pupil key point. The pupil edge location is obtained based on the pupil key point outputted by the third neural network. The pupil center location can be obtained by computing the pupil edge location (for example, computing the circular center location).

As an optional example, the eye center location can be obtained based on the foregoing upper eyelid line and the lower eyelid line. For example, the coordinate information obtained by adding the coordinate information of all key points of the upper eyelid line and the lower eyelid line, and dividing the number of all key points of the upper eyelid line and the lower eyelid line is used as the eye center location. Certainly, the eye center location can also be obtained in other ways, for example, computing the eye key point among the detected face key points to obtain the eye center location. The present application does not limit the implementation of obtaining the eye center location.

In this embodiment, a more accurate pupil center location can be obtained by obtaining the pupil center location based on the pupil key point detection, and a more accurate eye center location can be obtained by obtaining the eye center location based on the eyelid line positioning, so that more accurate gaze direction information can be obtained when the gaze direction is determined using the pupil center location and the eye center location. In addition, by positioning the pupil center location using the pupil key point detection, and determining the gaze direction using the pupil center location and the eye center location, the implementation of determining the gaze direction is accurate and easy to achieve.

In an optional example, the present disclosure may implement detection of the pupil edge location and detection of the eye center location using the existing neural network.

Figure 4:
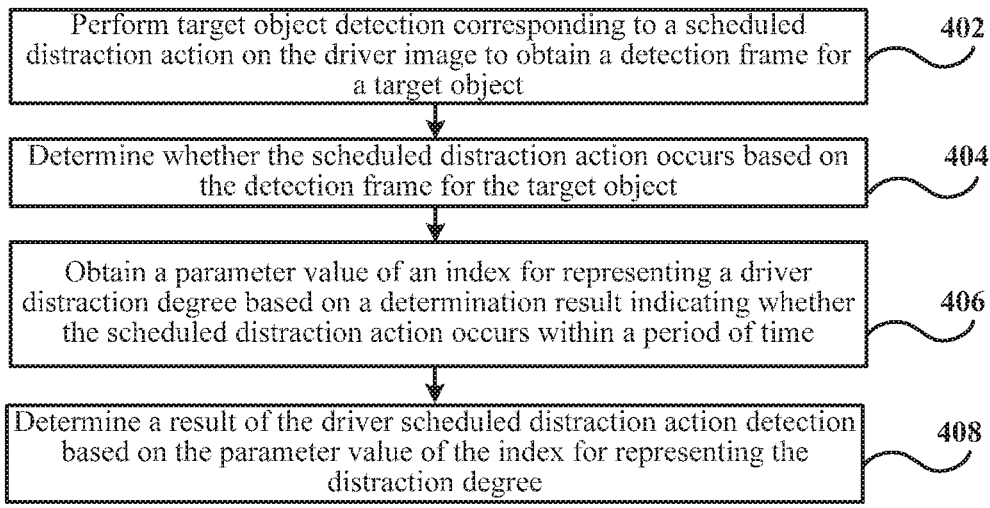
FIG. 4 is a flowchart of an embodiment of performing scheduled distraction action detection on a driver image according to the embodiments of the present application.

FIG. 4 is a flowchart of an embodiment of performing scheduled distraction action detection on a driver image according to the embodiments of the present application. In an optional example, the embodiment shown in FIG. 4 may be executed by the processor by invoking a corresponding instruction stored in a memory, or may be executed by a state detection module run by the processor. As shown in FIG. 4, in some of the embodiments, the performing scheduled distraction action detection on a driver image includes the following.

402: Perform target object detection corresponding to a scheduled distraction action on the driver image to obtain a detection frame for a target object.

404: Determine whether the scheduled distraction action occurs based on the detection frame for the target object.

This embodiment provides an implementation solution of performing scheduled distraction action detection on the driver. By detecting the target object corresponding to the scheduled distraction action and determining whether the distraction action occurs based on the detection frame for the detected target object, whether the driver is distracted can be determined, which is contributive to obtain the accurate result of the driver scheduled distraction action detection so as to improve the accuracy of the driving state monitoring result.

For example, when the scheduled distraction action is a smoking action, the foregoing operations 402-404 may include: performing face detection on the driver image via a fourth neural network to obtain a face detection frame, and extracting feature information of the face detection frame; and determining whether the smoking action occurs via the fourth neural network based on the feature information of the face detection frame.

For another example, when the scheduled distraction action is an eating action/drinking action/phone call action/entertainment action (i.e., an eating action and/or a drinking action and/or a phone call action and/or an entertainment action), the foregoing operations 402-404 may include: performing preset target object detection corresponding to the eating action/drinking action/phone call action/entertainment action on the driver image via a fifth neural network to obtain a detection frame for a preset target object, where the preset target object include: hands, mouth, eyes, or a target item, the target item for example may include, but is not limited to, at least one of following types: containers, foods, and electronic devices; determining a detection result of the scheduled distraction action based on the detection frame for the preset target object, the detection result of the scheduled distraction action including one of: no eating action/drinking action/phone call action/entertainment action occurs, the eating action occurs, the drinking action occurs, the phone call action occurs, or the entertainment action occurs.

In some optional examples, when the scheduled distraction action is an eating action/drinking action/phone call action/entertainment action (i.e., an eating action and/or a drinking action and/or a phone call action and/or an entertainment action), the determining a detection result of the scheduled distraction action based on the detection frame for the preset target object may include: determining the detection result of the scheduled dangerous action based on whether a detection frame for the hands, a detection frame for the mouth, a detection frame for the eyes, or a detection frame for the target item are detected, whether the detection frame for the hands overlaps the detection frame for the target item, the type of the target item, and whether the distance between the detection frame for the target item and the detection frame for the mouth or the detection frame for the eyes satisfies preset conditions.

Optionally, if the detection frame for the hands overlaps the detection frame for the target item, the type of the target item is a container or food, and the detection frame for the target item overlaps the detection frame for the mouth, it is determined that the eating action or the drinking action occurs; and/or if the detection frame for the hands overlaps the detection frame for the target item, the type of the target item is an electronic device, and the minimum distance between the detection frame for the target item and the detection frame for the mouth is less than a first preset distance, or the minimum distance between the detection frame for the target item and the detection frame for the eyes is less than a second preset distance, it is determined that the entertainment action or the phone call action occurs.

In addition, if the detection frame for the hands, the detection frame for the mouth, and the detection frame for any one target item are not detected simultaneously, and the detection frame for the hands, the detection frame for the eyes, and the detection frame for any one target items are not detected simultaneously, it is determined that the detection result of the distraction action is that no eating action, drinking action, phone call action, and entertainment action is detected; and/or if the detection frame for the hands does not overlap the detection frame for the target item, it is determined that the detection result of the distraction action is that no eating action, drinking action, phone call action, and entertainment action is detected; and/or if the type of the target item is a container or food, and the detection frame for the target item does not overlap the detection frame for the mouth, and/or the type of the target item is an electronic device, and the minimum distance between the detection frame for the target item and the detection frame for the mouth is not less than the first preset distance, or the minimum distance between the detection frame for the target item and the detection frame for the eyes is not less than the second preset distance, it is determined that the detection result of the distraction action is that no eating action, drinking action, phone call action, and entertainment action is detected.

In addition, the foregoing embodiment of performing scheduled distraction action detection on the driver image may further include: if the result of the driver scheduled distraction action detection is that a scheduled distraction action is detected, prompting the detected distraction action. For example, when the smoking action is detected, prompting the detection of smoking; when the drinking action is detected, prompting the detection of drinking; and when the phone call action is detected, prompting the detection of a phone call.

In an optional example, the foregoing operations of prompting the detected distraction action may be executed by a processor by invoking a corresponding instruction stored in a memory, or may be executed by a first prompting module run by the processor.

In addition, with reference to FIG. 4 again, another embodiment of performing driver scheduled distraction action detection on the driver image may also selectively include the following.

406: If the scheduled distraction action occurs, obtain a parameter value of an index for representing a driver distraction degree based on a determination result indicating whether the scheduled distraction action occurs within a period of time. The index for representing driver distraction degree for example may include, but are not limited to, at least one of: the number of occurrences of the scheduled distraction action, duration of the scheduled distraction action, or frequency of the scheduled distraction action, e.g., the number of occurrences of the smoking action, the duration of the smoking action, or the frequency of the smoking action; the number of occurrences of the drinking action, the duration of the drinking action, or the frequency of the drinking action; the number of occurrences of the phone call action, the duration of the phone call action, or the frequency of the phone call action, or the like.

408: Determine a result of the driver scheduled distraction action detection based on the parameter value of the index for representing the distraction degree.

The foregoing result of the driver scheduled distraction action detection may include: the scheduled distraction action is not detected, or the scheduled distraction action is detected. In addition, the foregoing result of the driver scheduled distraction action detection may also be the distraction level. For example, the foregoing distraction level may for example be divided into: non-distraction level (also called concentrated driving level), distraction driving prompting level (also called mild distraction driving level), and distraction driving warning level (also called severe distraction driving level). Certainly, the distraction level may also be divided into more levels, for example, non-distraction level driving, mild distraction driving level, moderate distraction driving level, severe distraction driving level or the like. Certainly, the distraction level in each embodiment of the present application may also be divided according to other conditions which are not limited the foregoing level division condition.

The distraction level may be determined by a preset condition satisfied by the parameter value of the index for representing the distraction degree. For example, if the scheduled distraction action is not detected, the distraction level is the non-distraction level (also called concentrated driving level); if it is detected that the duration of the scheduled distraction action is less than a first preset duration, and the frequency is less than a first preset frequency, the distraction level is the mild distraction driving level; and if it is detected that the duration of the scheduled distraction action is greater than the first preset duration, and/or the frequency is greater than the first preset frequency, the distraction level is the severe distraction driving level.

In addition, another embodiment of the driving state monitoring method of the present application may further include: outputting distraction prompt information based on the result of the driver distraction state detection and/or the result of the driver scheduled distraction action detection.

In general, if the result of the driver distraction state detection is the driver distraction, or the driver distraction level, and/or the result of the driver scheduled distraction action detection is that the scheduled distraction action is detected, the distraction prompt information may be outputted to remind the driver of concentration on driving.

In an optional example, the foregoing operation of outputting the distraction prompt information based on the result of the driver distraction state detection and/or the result of the driver scheduled distraction action detection may be executed by a processor by invoking a corresponding instruction stored in a memory, or may be executed by a second prompting module run by the processor.

Figure 5:
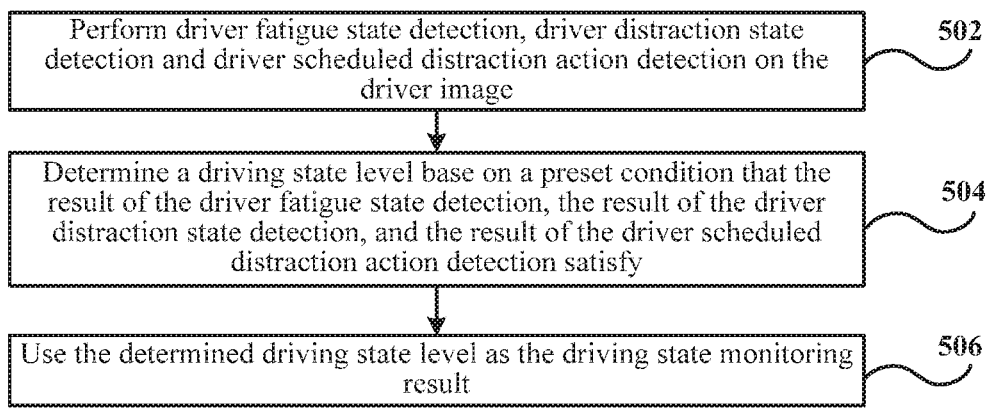
FIG. 5 is a flowchart of another embodiment of a driving state monitoring method according to the present application.

With reference to FIG. 5, another embodiment of the driving state monitoring method of the present application includes the following.

502: Perform driver fatigue state detection, driver distraction state detection and driver scheduled distraction action detection on the driver image to obtain the result of the driver fatigue state detection, the result of the driver distraction state detection and the result of the driver scheduled distraction action detection.

504: Determine a driving state level according to a preset condition that the result of the driver fatigue state detection, the result of the driver distraction state detection, and the result of the driver scheduled distraction action detection satisfy.

506: Use the determined driving state level as the driving state monitoring result.

In an optional example, each driving state level corresponds to a preset condition; the preset condition that the result of the driver fatigue state detection, the result of the driver distraction state detection and the result of the driver scheduled distraction action detection satisfy may be determined in real time; and the driving state level corresponding to the satisfied preset condition may be determined as the driver's driving state monitoring result. The driving state level for example may include: the normal driving state (also called concentrated driving level), the driving prompting state (the driving state is poor), and the driving warning state (the driving state is very poor).

In an optional example, the foregoing embodiment shown in FIG. 5 may be executed by a processor by invoking a corresponding instruction stored in a memory, or may be executed by an output module run by the processor.

For example, in an optional example, the preset condition corresponding to the normal driving level (also called concentrated driving level) may include: condition 1: the result of the driver fatigue state detection is: no fatigue state is detected, or non-fatigue driving level; condition 2: the result of the driver distraction state detection is: the driver concentrates on driving; and condition 3: the result of the driver scheduled distraction action detection is: no scheduled distraction action is detected, or the non-distraction level.

In the case that the foregoing conditions 1, 2, and 3 are all satisfied, the driving state level is the normal driving state (also called concentrated driving level).

For example, in an optional example, the preset condition corresponding to the driving prompting state (the driving state is poor) may include: condition 11: the result of the driver fatigue state detection is: the fatigue driving prompting level (also called the mild fatigue driving level); condition 22: the result of the driver distraction state detection is: the driver's attention is slightly distracted; and condition 33: the result of the driver scheduled distraction action detection is: the distraction driving prompting level (also called the mild distraction driving level).

In the case that any one of the foregoing conditions 11, 22, and 33 is satisfied, and the results in the other conditions do not reach the preset conditions corresponding to the more severe fatigue driving level, the attention distraction level, and the distraction level, the driving state level is the driving prompting state (the driving state is poor).

For example, in an optional example, the preset condition corresponding to the driving warning level (the driving level is very poor) may include: condition 111: the result of the driver fatigue state detection is: the fatigue driving warning level (also called the severe fatigue driving level); condition 222: the result of the driver distraction state detection is: the driver's attention is severely distracted; and condition 333: the result of the driver scheduled distraction action detection is: the distraction driving warning level (also called the severe distraction driving level).

In the case that any one of the foregoing conditions 111, 222, and 333 is satisfied, the driving state level is the driving warning state (the driving state is very poor).

Furthermore, a further embodiment of the driving state monitoring method of the present application may further include the following.

508: Perform a control operation corresponding to the driving state monitoring result.

In an optional example, the foregoing operation 508 may be executed by a processor by invoking a corresponding instruction stored in a memory, or may be executed by a first control module run by the processor.

In some of the optional examples, the operation 508 may include at least one of: if the driving state monitoring result satisfies a predetermined prompting/warning condition, e.g., satisfying a preset condition corresponding to the driving prompting state (the driving state is poor) or the driving state level is the driving prompting state (the driving state is poor), outputting prompting/warning information corresponding to the predetermined prompting/warning condition, e.g., prompting the driver with sound (e.g., voice or ringing or the like)/light (light up or light flashing or the like)/vibration or the like to call for attention of the driver so that the driver returns the distracted attention to driving or takes a rest, thereby implementing safe driving and avoiding road traffic accidents; and/or if the driving state monitoring result satisfies a predetermined driving mode switching condition or satisfies a preset condition corresponding to the driving warning state (the driving state is very poor), or the driving state level is the distraction driving warning level (also called the severe fatigue driving level), switching a driving mode to an automatic driving mode to implement safe driving and avoid road traffic accidents; and moreover, prompting the driver with sound (e.g., voice or ringing or the like)/light (light up or light flashing or the like)/vibration or the like to call for attention of the driver so that the driver returns the distracted attention to driving or takes a rest. It should be noted that the expression of "/" in the present disclosure represents the meaning of "or"; the expression of "A and/or B" in the present disclosure represents the meaning of "at least one of A or B".

In addition, a further embodiment of the driving state monitoring method of the present application may further include: performing image collection using an infrared camera, for example, performing image collection using an infrared camera deployed in at least one location within the vehicle to obtain a driver image.

The driver image in the embodiment of the present application is generally an image frame in a video captured by the infrared camera (including a near-infrared camera or the like) from a cab.

The wavelength of the infrared camera may include 940 nm or 850 num. The infrared camera may be provided at any location, where the driver can be photographed, in the cab of the vehicle. For example, the infrared camera may be deployed at at least one of the following locations: a location above or near a dashboard, a location above or near a center console, an A-pillar or nearby location, or a rear-view mirror or nearby location. For example, in some optional examples, the infrared camera can be disposed above the dashboard (such as directly above) and face forward, can be disposed above the center console (such as the middle location) and face forward, can be disposed on the A-pillar (such as it can be attached to the glass near the A-pillar) and face the driver's face, and can also be disposed on the rear-view mirror (such as it can be attached to the glass above the rear-view mirror) and face the driver's face. When the infrared camera is disposed above the dashboard or above the center console, the specific location of the camera can be determined based on the angle of view of the camera and the location of the driver. For example, when the camera is disposed above the dashboard, the infrared camera faces the driver, to ensure that the angle of view of the camera is not blocked by the steering wheel. When the camera is disposed at the location above the center console, if the angle of view of the camera is large enough, it can be aimed at the rear area to ensure that the driver is within the field of view of the camera; and if the angle of view is not large enough, the camera faces the driver to ensure that the driver is present in the angle of view of the infrared camera.

Since the light in the region where the driver is located (such as, in the car or in the cab) is often complicated, the quality of the driver image captured by an infrared camera tends to be better than the quality of the driver image captured by an ordinary camera, especially at night or in a dark environment such as a cloudy day or in a tunnel, the quality of the driver image captured by the infrared camera is usually significantly better than the quality of the driver image captured by the ordinary camera, which is beneficial to improve the accuracy of the driver distraction state detection and distraction action detection, so as to improve the accuracy of driving state monitoring.

Optionally, in practical application, the original image captured by the camera often cannot be directly used due to various restrictions and random interference. In some optional examples of the present application, gray-scale preprocessing can be performed on the driver image captured by the infrared camera, so that a red, green and blue (RGB) 3-channel image is converted into a gray-scale image, and then the operations such as the driver's identity authentication, distraction state detection and distraction action detection are performed to improve the accuracy of identity authentication, distraction state detection and distraction action detection.

In addition, each of the foregoing embodiments of the present application may further include: performing driver gesture detection based on the driver image; and generating a control instruction based on the result of the driver gesture detection.

In an optional example, the foregoing operation of performing driver gesture detection based on the driver image may be executed by a processor by invoking a corresponding instruction stored in a memory, or may be executed by a gesture detection module run by the processor. In an optional example, the foregoing operation of generating a control instruction based on the result of the driver gesture detection may be executed by a processor by invoking a corresponding instruction stored in a memory, or may be executed by an instruction generation module run by the processor.

In some of the embodiments, the performing driver gesture detection based on the driver image may include: detecting a hand key point in a driver image of a current frame; and using a static gesture determined based on the detected hand key point as the result of the driver gesture detection, i.e., the driver gesture detected at this moment is the static gesture.

In some of the embodiments, the performing driver gesture detection based on the driver image may include: detecting hand key points of a plurality of driver image frames in a driver video captured by the infrared camera; and using a dynamic gesture determined based on the detected hand key points of the plurality of driver image frames as the result of the driver gesture detection, i.e., the driver gesture detected at this moment is the dynamic gesture.

The control instruction generated based on the result of the driver gesture detection may be used for controlling the state of the vehicle or components or applications on the vehicle and the working states thereof, e.g., lifting/lowering the window, adjusting the volume, turning on an air conditioner, turning off the air conditioner, adjusting the air volume of the air conditioner, making a call, answering the phone, enabling or disabling applications (such as music, radio, or Bluetooth) or the like.

In addition, each of the foregoing embodiments of the present application may further include: performing facial recognition on the driver image; and performing authentication control based on the result of the facial recognition.

In an optional example, the foregoing operation of performing facial recognition on the driver image may be executed by a processor by invoking a corresponding instruction stored in a memory, or may be executed by a facial recognition module run by the processor. The foregoing operation of performing authentication control based on the result of the facial recognition may be executed by a processor by invoking a corresponding instruction stored in a memory, or may be executed by a second control module run by the processor.

In some of the embodiments, the performing facial recognition on the driver image may include the following.

Perform face detection on the driver image via a sixth neural network, and perform feature extraction on the detected face to obtain a face feature. For example, the sixth neural network may perform face location detection on each input driver image frame, output a face detection frame, and perform feature extraction on the face in the face detection frame.

Perform face matching between the face feature and face feature templates in a database. For example, a threshold can be preset, and perform search matching between the extracted face feature and the face feature templates stored in the database. If the similarity between the extracted face feature and a certain face feature template in the database exceeds the preset threshold, it is determined that the extracted face feature matches the face feature template, and it is indicated that the driver is a registered user, and user information of the driver, including the face feature template and identity information (e.g., name, login name or the like), exists in the database; and if the similarity between the extracted face feature and any face feature template in the database does not exceed the preset threshold, it is determined that no face feature template matching the foregoing face feature exists in the database, and it is indicated that the driver is an unregistered user.

If a face feature template matching the face feature exists in the database, output identity information corresponding to the face feature template matching the face feature.

And/or if no face feature template matching the foregoing face feature exists in the database, prompt the driver to register; in response to receiving a registration request from the driver, perform face detection on the collected driver image via the sixth neural network, and perform feature extraction on the detected face to obtain the face feature; establish user information of the driver in the database by using the face feature as the face feature template of the driver, the user information including the face feature template of the driver and the identity information inputted by the driver.

Furthermore, the foregoing embodiment may further include: storing the driving state monitoring result in the user information of the driver in the database; and recording the driving state monitoring result of the driver to facilitate subsequent consulting the driving state monitoring result of the driver, or analyzing and collecting statistics about the driving behavior habits of the driver.

This embodiment implements identity authentication and registration of the driver through facial recognition to identify the identity information of the driver, and records and analyzes the driving state monitoring result of the driver so as to learn about the driving behavior habits of the driver or the like.

In some of the application scenarios, when the driver starts the vehicle and starts the driving monitoring apparatus or the driver monitoring system, the facial recognition on the driver image collected by the infrared camera is performed, and based on the result of the facial recognition indicating whether the driver is a registered user, corresponding authentication control operation is performed. For example, only when the driver is the registered user, the driver is allowed to start the vehicle and enter the driving monitoring apparatus or the driver monitoring system.

Alternatively, in other application scenarios, when the driver requests to use a gesture control function, the facial recognition on the driver image collected by the infrared camera is performed, and based on the result of the facial recognition indicating whether the driver is a registered user, corresponding authentication control operation is performed. For example, only when the driver is the registered user, the driver gesture detection is performed based on the driver image, and a control command is generated based on the result of the driver gesture detection.

The driving state monitoring method of the foregoing embodiment of the present application can be implemented by: performing image collection by an infrared (including near-infrared) camera to obtain an driver image, and then sending the driver image to a single chip microcomputer, FPGA, ARM, CPU, GPU, or microprocessor which can load the neural network, as well as an electronic device such as a smart mobile phone, a notebook computer, a tablet computer (PAD), a desktop computer, or a server for implementation. The electronic device can run a computer program (also called a program code), the computer program may be stored in a computer readable storage medium such as a flash memory, a cache, a hard disk, or an optical disk.

Any driving state monitoring method provided by the embodiments of the present application may be executed by any suitable device having data processing capacity, including, but are not limited to, a terminal device, a server or the like. Alternatively, any driving state monitoring method provided by the embodiments of the present application may be executed by the processor, for example, the processor executes any driving state monitoring method provided by the embodiments of the present application by invoking a corresponding instruction stored in the memory, and details are not described below again.

The person of ordinary skill in the art may understand that all or some steps for implementing the embodiments of the foregoing method may be achieved by a program instruction related hardware; the foregoing program can be stored in a computer readable storage medium; when the program is executed, steps including the embodiments of the foregoing method is executed. Moreover, the foregoing storage medium includes various media capable of storing program codes, such as ROM, RAM, a magnetic disk, or an optical disk.

Figure 6:
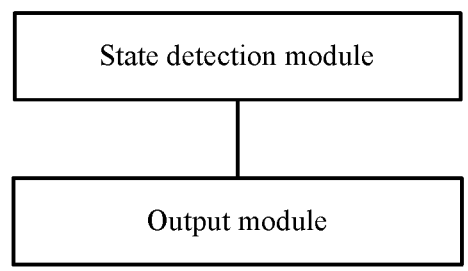
FIG. 6 is a schematic structural diagram of an embodiment of a driving state monitoring apparatus of the present application.

FIG. 6 is a schematic structural diagram of an embodiment of a driving state monitoring apparatus of the present application. The driving state monitoring apparatus of the embodiment may be configured to implement each of the foregoing embodiments of the driving state monitoring method of the present application. As shown in FIG. 6, the driving state monitoring apparatus of the embodiment includes: a state detection module, and an output module and/or an intelligent driving control module.

The state detection module is configured to perform driver state detection on a driver image.

For an optional implementation solution of the state detection module for performing driver state detection on the driver image in the embodiment, reference may be made to the corresponding operation in the driving state monitoring method according to any of the foregoing embodiments of the present application, and details are not described herein again.

The output module is configured to output a driving state monitoring result of a driver based on a result of the driver state detection.

For an optional implementation solution of the output module for outputting the driving state monitoring result of the driver based on the result of the driver state detection in the embodiment, reference may be made to the corresponding operation in the driving state monitoring method according to any of the foregoing embodiments of the present application, and details are not described herein again.

The intelligent driving control module is configured to perform intelligent driving control on a vehicle based on the result of the driver state detection.

In some embodiments, the driver state detection, for example, may include, but is not limited to, at least one of: driver fatigue state detection, driver distraction state detection, or driver scheduled distraction action detection, and thus, the result of the driver state detection correspondingly includes, but is not limited to, at least one of: a result of the driver fatigue state detection, a result of the driver distraction state detection, or a result of the driver scheduled distraction action detection.

In some embodiments, the output module is configured, when outputting the driving state monitoring result of the driver based on the result of the driver state detection, to: determine a driving state level according to a preset condition that the result of the driver fatigue state detection, the result of the driver distraction state detection, and the result of the driver scheduled distraction action detection satisfy; and use the determined driving state level as the driving state monitoring result.

The scheduled distraction action in the embodiment of the present application may be any distraction action that may distract the driver, for example, a smoking action, a drinking action, an eating action, a phone call action, an entertainment action or the like. The eating action is eating foods, for example, fruits, snacks or the like. The entertainment action is any action executed with the aid of an electronic device, for example, sending messages, playing games, singing or the like. The electronic device is for example a mobile terminal, a handheld computer, a game machine or the like.

Based on the driving state monitoring apparatus provided by the foregoing embodiment of the present application, driver state detection can be performed on the driver image, and the driving state monitoring result of the driver is outputted based on the result of the driver state detection, to implement real-time monitoring of the driving state of the driver, so that corresponding measures are taken in time when the driving state of the driver is poor to ensure safe driving and avoid road traffic accidents.

Figure 7:
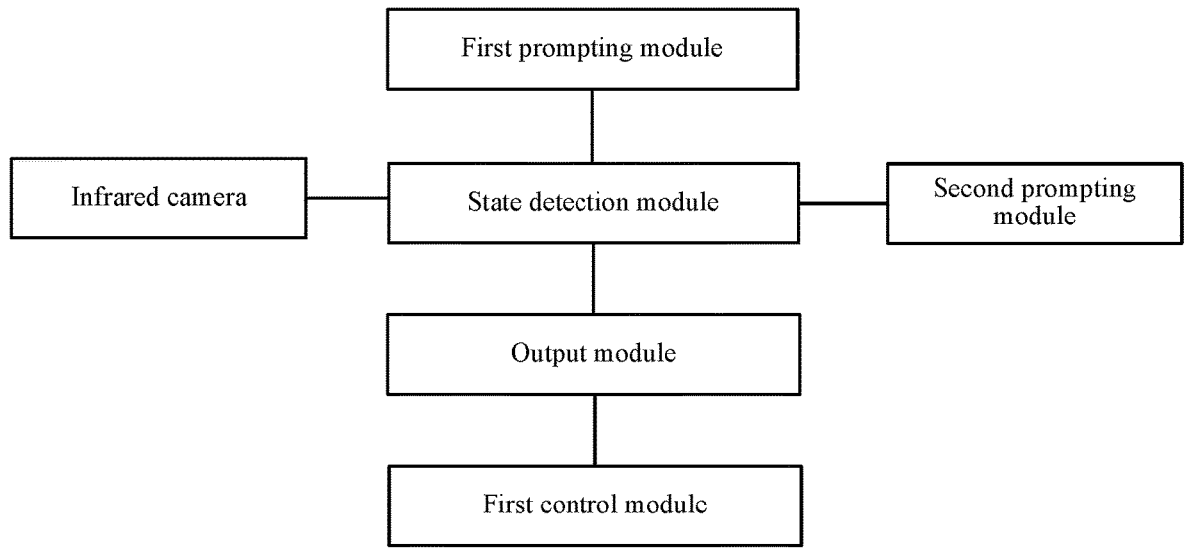
FIG. 7 is a schematic structural diagram of another embodiment of a driving state monitoring apparatus of the present application.

FIG. 7 is a schematic structural diagram of another embodiment of a driving state monitoring apparatus of the present application. As shown in FIG. 7, compared with the embodiment shown in FIG. 6, the driving state monitoring apparatus of the embodiment further includes: a first prompting module, configured to prompt, if the result of the driver scheduled distraction action detection is that a scheduled distraction action is detected, the detected distraction action.

With reference to FIG. 7 again, another embodiment of the driving state monitoring apparatus of the present application may further include: a second prompting module, configured to output distraction prompt information based on the result of the driver distraction state detection and/or the result of the driver scheduled distraction action detection.

In addition, with reference to FIG. 7 again, a further embodiment of the driving state monitoring apparatus of the present application may further include: a first control module, configured to perform a control operation corresponding to the driving state monitoring result.

In some of the embodiments, the first control module is configured to: output prompting/warning information corresponding to the predetermined prompting/warning condition if the determined driving state monitoring result satisfies the predetermined prompting/warning condition; and/or switch a driving mode to an automatic driving mode if the determined driving state monitoring result satisfies the predetermined driving mode switching condition.

In addition, a further embodiment of the driving state monitoring apparatus of the present application may further include: a facial recognition module, configured to perform facial recognition on the driver image; and a second control module, configured to perform authentication control based on a result of the facial recognition.

In some of the embodiments, the facial recognition module is configured to: perform face detection on the driver image via a sixth neural network, and perform feature extraction on the detected face to obtain a face feature; perform face matching between the face feature and a face feature template in a database; and if the face feature template matching the face feature exists in the database, output identity information corresponding to the face feature template matching the face feature.

In some other embodiments, the second control module is further configured to: if no face feature template matching the face feature exists in the database, prompt the driver to register; and establish user information of the driver in the database by using the face feature sent by the facial recognition module as the face feature template of the driver, the user information including the face feature template of the driver and the identity information inputted by the driver. Accordingly, the facial recognition module is further configured to, in response to receiving a registration request from the driver, perform face detection on the collected driver image via the sixth neural network, and perform feature extraction on the detected face to obtain a face feature, and send the face feature to the second control module.

In some other embodiments, the output module is further configured to store the driving state monitoring result in the user information of the driver in the database.

In addition, with reference to FIG. 7 again, another embodiment of the driving state monitoring apparatus of the present application may further include: at least one infrared camera correspondingly deployed in at least one location within a vehicle, and configured to perform image collection to obtain the driver image.

At least one location for example may include, but is not limited to, at least one of the following locations: a location above or near a dashboard, a location above or near a center console, an A-pillar or nearby location, or a rear-view mirror or nearby location.

In addition, a further embodiment of the driving state monitoring apparatus of the present application may further include: a gesture detection module, configured to perform driver gesture detection based on the driver image; and an instruction generation module, configured to generate a control instruction based on a result of the driver gesture detection.

In some of the embodiments, the gesture detection module is configured to detect a hand key point in a driver image of a current frame, and use a static gesture determined based on the detected hand key point as the result of the driver gesture detection.

In some of the embodiments, the gesture detection module is configured to detect hand key points of a plurality of driver image frames in a driver video, and use a dynamic gesture determined based on the detected hand key points of the plurality of driver image frames as the result of the driver gesture detection.

Figure 8:
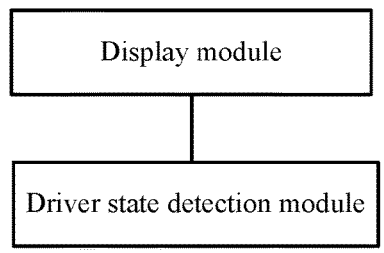
FIG. 8 is a schematic structural diagram of an embodiment of a driver monitoring system of the present application.

FIG. 8 is a schematic structural diagram of an embodiment of a driver monitoring system of the present application. The driver monitoring system of the embodiment may be configured to implement each of the foregoing embodiments of the driving state monitoring method of the present application. As shown in FIG. 8, the driver monitoring system of the embodiment includes a display module and a driver state detection module.

The display module is configured to display a driver image and a driving state monitoring result of the driver.

The driver state detection module is configured to perform driver state detection on the driver image, and output the driving state monitoring result of the driver based on a result of the driver state detection.

The driver state detection may include, but is not limited to at least one of: driver fatigue state detection, driver distraction state detection, or driver scheduled distraction action detection.

Based on the driver monitoring system provided by the foregoing embodiment of the present application, driver state detection may be performed on the driver image, and the driving state monitoring result of the driver is outputted based on the result of the driver state detection, to implement real-time monitoring of the driving state of the driver, so that corresponding measures are taken in time when the driving state of the driver is poor to ensure safe driving and avoid road traffic accidents.

In some of the embodiments, the display module includes: a first display region, configured to display the driver image and prompting/warning information corresponding to the driving state monitoring result; and a second display region, configured to display a scheduled distraction action.

In some of the embodiments, the driver state detection module is further configured to perform facial recognition on the driver image. Accordingly, the first display region is further configured to display a result of the facial recognition.

In some of the embodiments, the driver state detection module is further configured to perform driver gesture detection based on the driver image. Accordingly, the display module further includes: a third display region, configured to display a result of the gesture detection, the result of the gesture detection including a static gesture or a dynamic gesture.

Figure 9:
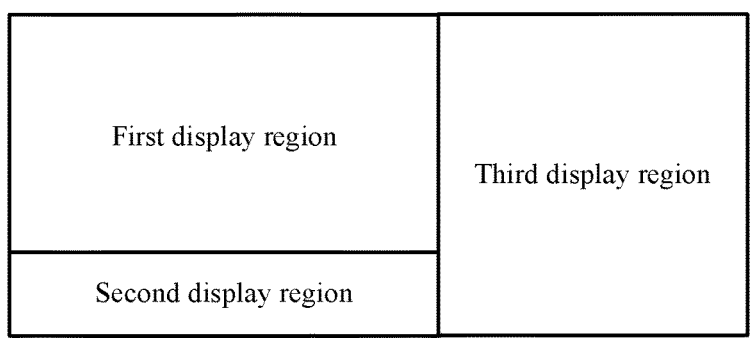
FIG. 9 is a schematic structural diagram of an embodiment of a display region of a display module in the driver monitoring system of the present application.

FIG. 9 is a schematic structural diagram of an embodiment of a display region of the display module in the driver monitoring system of the present application.

Figure 10:
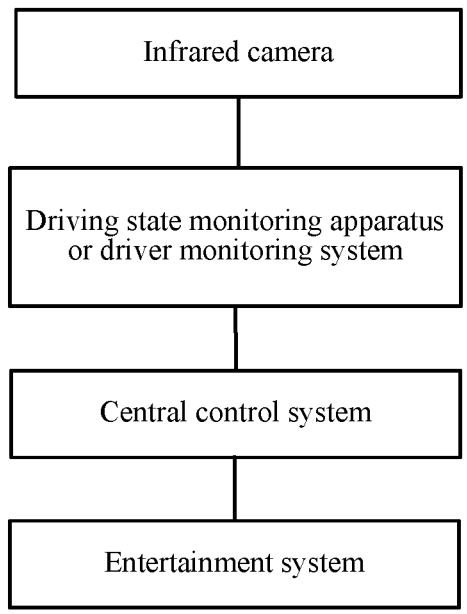
FIG. 10 is a schematic structural diagram of an embodiment of a vehicle of the present application.

FIG. 10 is a schematic structural diagram of an embodiment of a vehicle of the present application. As shown in FIG. 10, the vehicle of the embodiment includes a central control system, and further includes the driving state monitoring apparatus or the driver monitoring system according to any one of the foregoing embodiments of the present application.

In some of the embodiments, the central control system is configured to: perform intelligent driving control based on the result of the driver state detection outputted by the driving state monitoring apparatus or the driver monitoring system; and/or switch a driving mode to an automatic driving mode when the driving state monitoring result outputted by the driving state monitoring apparatus or the driver monitoring system satisfies a predetermined driving mode switching condition, and perform automatic driving control on the vehicle in the automatic driving mode; and/or invoke, when the driving state monitoring result satisfies the preset predetermined prompting/warning condition, an entertainment system (such as a speaker, a buzzer, or a lighting device) in the vehicle or an entertainment system (such as a speaker, a buzzer, or a lighting device) external to the vehicle to output prompting/warning information corresponding to the predetermined prompting/warning condition.

In another embodiment, the central control system is further configured to correspondingly control the vehicle or the components (such as the windows, the air conditioner, or the player) or applications (such as music, radio, or Bluetooth) on the vehicle or the like based on a control instruction generated based on the result of the gesture detection outputted by the driving state monitoring apparatus or the driver monitoring system.

In another embodiment, the central control system is further configured to switch a driving mode to a manual driving mode when a driving instruction of switching to manual driving is received.

With reference to FIG. 10 again, the vehicle of the foregoing embodiment may further include: an entertainment system, configured to output the prompting/warning information corresponding to the predetermined prompting/warning condition according to the control instruction of the central control system; and/or adjust the pre-warning effect of the prompting/warning information or the playing effect of entertainment according to the control instruction of the central control system.

The entertainment system, for example, may include a speaker, a buzzer, or a lighting device.

With reference to FIG. 10 again, the vehicle of the foregoing embodiment may further include: at least one infrared camera, configured to perform image collection.

In some of the embodiments, the infrared camera in the vehicle may be deployed in at least one location within the vehicle, e.g., may be deployed in at least one of the following locations: a location above or near a dashboard, a location above or near a center console, an A-pillar or nearby location, or a rear-view mirror or nearby location or the like.

Figure 11:
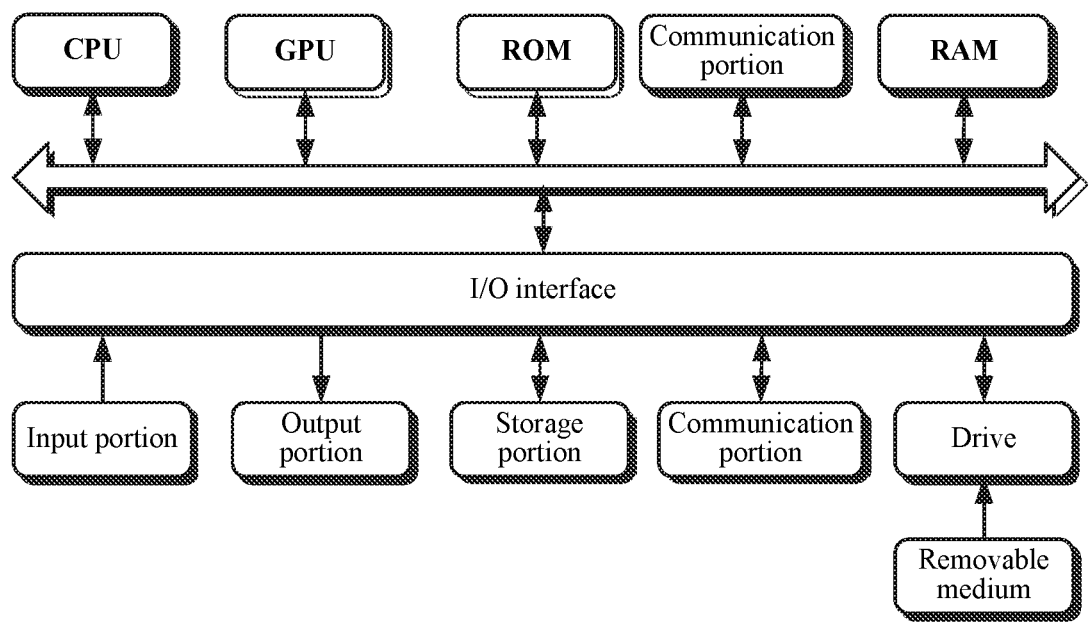
FIG. 11 is a schematic structural diagram of an application embodiment of an electronic device of the present application.

FIG. 11 is a schematic structural diagram of an application embodiment of an electronic device of the present application. With reference to FIG. 11 below, FIG. 11 is a schematic structural diagram of an electronic device suitable for implementing a terminal device or a server of an embodiment of the present application. As shown in FIG. 11, the electronic device includes one or more processors, a communication portion or the like. The one or more processors are, for example, one or more central processing units (CPUs), and/or one or more image processors (GPUs) or the like. The processor may execute various appropriate actions and processing according to executable instructions stored in a read only memory (ROM) or executable instructions loaded from a memory portion into a random access memory (RAM). The communication portion may include, but is not limited to, a network card. The network card may include, but is not limited to, an IB (Infiniband) network card. The processor may communicate with the ROM and/or the RAM to execute executable instructions. The processor is connected to the communication portion through the bus, and communicates with other target devices via the communication portion, thereby completing operations corresponding to any method provided by the embodiments of the present application, for example, performing driver state detection on the driver image; and outputting the driving state monitoring result of the driver and/or performing intelligent driving control based on the result of the driver state detection.

In addition, the RAM may further store various programs and data required during an operation of the apparatus. The CPU, the ROM, and the RAM are connected to each other via the bus. In the presence of the RAM, the ROM is an optional module. The RAM stores executable instructions, or writes executable instructions into the ROM during running. The executable instructions cause the processor to perform the operations of the method according to any one of the embodiments of the present application. An input/output (I/O) interface is also connected to the bus. The communication portion may be integrated, or may be set as having a plurality of sub-modules (for example, a plurality of IB network cards) respectively connected to the bus.

The following components are connected to the I/O interface: an input portion including a keyboard, a mouse or the like; an output portion including a cathode-ray tube (CRT), a liquid crystal display (LCD), a speaker or the like; a storage portion including a hard disk or the like; and a communication portion of a network interface card including an LAN card, a modem or the like. The communication portion executes communication processing through a network such as the Internet. A drive is also connected to the I/O interface according to requirements. A removable medium such as a magnetic disk, an optical disk, a magneto-optical disk, a semiconductor memory or the like is installed on the drive according to requirements, so that a computer program read from the removable medium may be installed on the storage portion according to requirements.

It should be noted that, the architecture shown in FIG. 11 is merely an optional implementation. During specific practice, the number and types of the components in FIG. 11 may be selected, decreased, increased, or replaced according to actual requirements. Different functional components may be separated or integrated or the like. For example, the GPU and the CPU may be separated, or the GPU may be integrated on the CPU, and the communication portion may be separated from or integrated on the CPU or the GPU or the like. These alternative implementations all fall within the protection scope of the present application.

Particularly, a process described above with reference to a flowchart according to an embodiment of the present application may be implemented as a computer software program. For example, an embodiment of the present application includes a computer program product. The computer program product includes a computer program tangibly included in a machine-readable medium. The computer program includes a program code for executing a method shown in the flowchart. The program code may include instructions for executing each corresponding step of the driving state monitoring method according to any one of the embodiments of the present application. In such embodiment, the computer program is downloaded and installed from the network through the communication portion, and/or is installed from the removable medium. When executed by the CPU, the computer program executes the foregoing function defined in the method of the present application.

In addition, the embodiment of the present application also provides a computer program, including computer instructions. When the computer instructions run in a processor of a device, the driving state monitoring method according to any one of the foregoing embodiments of the present application is implemented.

In addition, the embodiment of the present application also provides a computer readable storage medium having a computer program stored thereon. When the computer program is executed by a processor, the driving state monitoring method according to any one of the foregoing embodiments of the present application is implemented.

Various embodiments in this description are described in a progressive manner, emphasized descriptions of each embodiment may include a difference between this embodiment and another embodiment, and same or similar parts between the embodiments may be cross-referenced. For the system embodiment, since the system embodiment basically corresponds to the method embodiment, the description is relatively simple. For related parts, refer to related descriptions of the method embodiment.

The methods, the apparatuses, the systems and the devices of the present application may be implemented in many manners. For example, the methods, apparatuses, systems and devices of the present application may be implemented by using software, hardware, firmware, or any combination of software, hardware, and firmware. Unless otherwise specially stated, the foregoing sequences of steps of the methods are merely for description, and are not intended to limit the steps of the methods of the present application. In addition, in some embodiments, the present application may be implemented as programs recorded in a recording medium. The programs include machine-readable instructions for implementing the methods according to the present application. Therefore, the present application further covers the recording medium storing the programs for performing the methods according to the present application.

The descriptions of the present application are provided for the purpose of examples and description, and are not intended to be exhaustive or limit the present application to the disclosed form. Many modifications and changes are obvious to a person of ordinary skill in the art. The embodiments are selected and described to better describe a principle and an actual application of the present application, and to make the person of ordinary skill in the art understand the present application, so as to design various embodiments with various modifications applicable to particular use.

The invention claimed is:

1. A driving state monitoring method, comprising:
    performing driver state detection on a driver image; and
    performing at least one of: outputting a driving state monitoring result of a driver or performing intelligent driving control based on a result of the driver state detection;
    wherein the driver state detection comprises at least one of: driver fatigue state detection, driver distraction state detection, or driver scheduled distraction action detection,
    wherein in response to the scheduled distraction action being the smoking action, the performing driver state detection on a driver image comprises:
    performing face detection on the driver image via a fourth neural network to obtain a face detection frame, and extracting feature information of the face detection frame; and
    determining whether the smoking action occurs via the fourth neural network based on the feature information of the face detection frame.

2. The method according to claim 1, wherein the performing driver fatigue state detection on a driver image comprises:
    detecting at least part of a face region of the driver in the driver image to obtain state information of the at least part of the face region, the state information of the at least part of the face region comprising at least one of: eye open/closed state information or mouth open/closed state information;
    obtaining a parameter value of an index for representing a driver fatigue state based on the state information of the at least part of the face region within a period of time; and
    determining a result of the driver fatigue state detection based on the parameter value of the index for representing the driver fatigue state;
    wherein the index for representing the driver fatigue state comprises at least one of: an eye closure degree or a yawning degree;
    wherein the parameter value of the eye closure degree comprises at least one of: a number of eye closures, an eye closure frequency, eye closure duration, eye closure amplitude, a number of eye semi-closures, or an eye semi-closure frequency; or the parameter value of the yawning degree comprises at least one of: a yawning state, a number of yawns, yawning duration, or a yawning frequency.

3. The method according to claim 1, wherein the performing driver distraction state detection on a driver image comprises:
    performing at least one of face orientation or gaze direction detection on the driver in the driver image to obtain at least one of face orientation information or gaze direction information;
    determining a parameter value of an index for representing a driver distraction state based on at least one of the face orientation information or the gaze direction information within a period of time, the index for representing the driver distraction state comprises at least one of: a face orientation deviation degree or a gaze deviation degree; and
    determining a result of the driver distraction state detection based on the parameter value of the index for representing the driver distraction state;
    wherein the parameter value of the face orientation deviation degree comprises at least one of: a number of head turns, head turning duration, or a head turning frequency; or the parameter value of the gaze deviation degree comprises at least one of: a gaze direction deviation angle, gaze direction deviation duration, or a gaze direction deviation frequency.

4. The method according to claim 3, wherein the performing at least one of face orientation or gaze direction detection on the driver image comprises:
    detecting face key points of the driver image; and
    performing at least one of face orientation or gaze direction detection based on the face key points.

5. The method according to claim 4, wherein the performing face orientation detection based on the face key points to obtain the face orientation information comprises:
    obtaining feature information of head pose based on the face key points; and
    determining the face orientation information based on the feature information of the head pose.

6. The method according to claim 5, wherein the obtaining feature information of head pose based on the face key points, and determining the face orientation information based on the feature information of the head pose comprise:
    extracting the feature information of the head pose via a first neural network based on the face key points; and performing face orientation estimation via a second neural network based on the feature information of the head pose to obtain the face orientation information.

7. The method according to claim 4, wherein the performing gaze direction detection based on the face key points to obtain the gaze direction information comprises:
determining a pupil edge location based on an eye image positioned by an eye key point among the face key points, and computing a pupil center location based on the pupil edge location; and
computing the gaze direction information based on the pupil center location and an eye center location.

8. The method according to claim 7, wherein the determining a pupil edge location based on an eye image positioned by an eye key point among the face key points comprises:
detecting, based on a third neural network, a pupil edge location of an eye region image among images divided based on the face key points, and obtaining the pupil edge location based on information outputted by the third neural network.

9. The method according to claim 1, wherein the scheduled distraction action comprises at least one of: a smoking action, a drinking action, an eating action, a phone call action, or an entertainment action.

10. The method according to claim 9, further comprising:
if the result of the driver scheduled distraction action detection is that a scheduled distraction action is detected, prompting the detected distraction action; or
outputting distraction prompt information based on at least one of the result of the driver distraction state detection or the result of the driver scheduled distraction action detection.

11. The method according to claim 1, wherein the driver scheduled distraction action detection comprises:
performing target object detection corresponding to the scheduled distraction action on the driver image to obtain a detection frame for a target object; and
determining whether the scheduled distraction action occurs based on the detection frame for the target object.

12. The method according to claim 11, further comprising:
if the scheduled distraction action occurs, obtaining a determination result indicating whether the scheduled distraction action occurs within a period of time to obtain a parameter value of an index for representing a distraction degree; and
determining the result of the driver scheduled distraction action detection based on the parameter value of the index for representing the distraction degree;
wherein the parameter value of the distraction degree comprises at least one of: a number of occurrences of the scheduled distraction action, duration of the scheduled distraction action, or a frequency of the scheduled distraction action.

13. The method according to claim 11, wherein when the scheduled distraction action is the eating action/drinking action/phone call action/entertainment action, the performing target object detection corresponding to the scheduled distraction action on the driver image to obtain a detection frame for a target object, and the determining whether the scheduled distraction action occurs based on the detection frame for the target object comprise:
performing preset target object detection corresponding to the eating action/drinking action/phone call action/entertainment action on the driver image via a fifth neural network to obtain a detection frame for a preset target object; the preset target object comprising: hands, mouth, eyes, or a target item; and the target item comprising at least one of following types: containers, foods, or electronic devices; and
determining a detection result of the scheduled distraction action based on the detection frame for the preset target object; the detection result of the scheduled distraction action comprising one of: no eating action/drinking action/phone call action/entertainment action occurs, the eating action occurs, the drinking action occurs, the phone call action occurs, or the entertainment action occurs.

14. The method according to claim 13, wherein the determining a detection result of the distraction action based on the detection frame for the preset target object comprises:
determining the detection result of the scheduled distraction action based on whether a detection frame for the hands, a detection frame for the mouth, a detection frame for the eyes, or a detection frame for the target item are detected, whether the detection frame for the hands overlaps the detection frame for the target item, a type of the target item, and whether a distance between the detection frame for the target item and the detection frame for the mouth or the detection frame for the eyes satisfies preset conditions.

15. The method according to claim 14, wherein the determining the detection result of the distraction action based on whether the detection frame for the hands overlaps the detection frame for the target item, and whether a location relationship between the detection frame for the target item and the detection frame for the mouth or the detection frame for the eyes satisfies preset conditions comprises:
if the detection frame for the hands overlaps the detection frame for the target item, the type of the target item is a container or food, and the detection frame for the target item overlaps the detection frame for the mouth, determining that the eating action or the drinking action occurs; or
if the detection frame for the hands overlaps the detection frame for the target item, the type of the target item is an electronic device, and the minimum distance between the detection frame for the target item and the detection frame for the mouth is less than a first preset distance, or the minimum distance between the detection frame for the target item and the detection frame for the eyes is less than a second preset distance, determining that the entertainment action or the phone call action occurs.

16. The method according to claim 14, further comprising:
if the detection frame for the hands, the detection frame for the mouth, and the detection frame for any one target item are not detected simultaneously, and the detection frame for the hands, the detection frame for the eyes, and the detection frame for any one target item are not detected simultaneously, determining that the detection result of the distraction action is that no eating action, drinking action, phone call action and entertainment action is detected; or
if the detection frame for the hands does not overlap the detection frame for the target item, determining that the detection result of the distraction action is that no eating action, drinking action, phone call action, and entertainment action is detected; or if the type of the target item is a container or food and the detection frame for the target item does not overlaps the detection frame for the mouth, or the type of the target item is an electronic device and the minimum distance between the detection frame for the target item and the detection frame for the mouth is not less than the first preset distance, or the minimum distance between the detection frame for the target item and the detection frame for the eyes is not less than the second preset distance, determining that the detection result of the distraction action is that no eating action, drinking action, phone call action, and entertainment action is detected.

17. The method according to claim 1, wherein the outputting a driving state monitoring result of a driver based on the result of the driver state detection comprises:
determining a driving state level according to a preset condition that the result of the driver fatigue state detection, the result of the driver distraction state detection, and the result of the driver scheduled distraction action detection satisfy; and
using the determined driving state level as the driving state monitoring result.

18. The method according to claim 1, further comprising:
performing a control operation corresponding to the driving state monitoring result;
wherein the performing a control operation corresponding to the driving state monitoring result comprises at least one of:
if the determined driving state monitoring result satisfies a predetermined prompting/warning condition, outputting prompting/warning information corresponding to the predetermined prompting/warning condition; or
if the determined driving state monitoring result satisfies a predetermined driving mode switching condition, switching a driving mode to an automatic driving mode.

19. The method according to claim 1, further comprising:
performing facial recognition on the driver image; and
performing authentication control based on a result of the facial recognition.

20. The method according to claim 19, wherein the performing facial recognition on the driver image comprises:
performing face detection on the driver image via a sixth neural network, and performing feature extraction on the detected face to obtain a face feature;
performing face matching between the face feature and face feature templates in a database; and
if a face feature template matching the face feature exists in the database, outputting identity information corresponding to the face feature template matching the face feature.

21. The method according to claim 20, further comprising:
if no face feature template matching the face feature exists in the database, prompting the driver to register;
in response to receiving a registration request from the driver, performing face detection on the collected driver image via the sixth neural network, and performing feature extraction on the detected face to obtain a face feature; and
establishing user information of the driver in the database by using the face feature as the face feature template of the driver, the user information comprising the face feature template of the driver and the identity information inputted by the driver.

22. The method according to claim 20, further comprising:
storing the driving state monitoring result in the user information of the driver in the database.

23. The method according to claim 1, further comprising:
performing image collection using an infrared camera to obtain the driver image;
wherein the performing image collection using an infrared camera comprises:
performing image collection using the infrared camera deployed in at least one location within a vehicle;
wherein the at least one location comprises at least one of the following locations: a location above or near a dashboard, a location above or near a center console, an A-pillar or nearby location, or a rear-view mirror or nearby location.

24. The method according to claim 1, further comprising:
performing driver gesture detection based on the driver image; and
generating a control instruction based on a result of the driver gesture detection.

25. The method according to claim 24, wherein the performing driver gesture detection based on the driver image comprises:
detecting a hand key point in a driver image of a current frame; and
using a static gesture determined based on the detected hand key point as the result of the driver gesture detection; or
wherein the performing driver gesture detection based on the driver image comprises:
detecting hand key points of a plurality of driver image frames in a driver video; and
using a dynamic gesture determined based on the detected hand key points of the plurality of driver image frames as the result of the driver gesture detection.

26. A driving state monitoring apparatus, comprising:
a processor; and
a memory storing instructions, the instructions when executed by the processor, cause the processor to perform operations, the operations comprising:
performing driver state detection on a driver image; and
performing at least one of: outputting a driving state monitoring result of a driver based on a result of the driver state detection or performing intelligent driving control based on the result of the driver state detection;
wherein the driver state detection comprises at least one of: driver fatigue state detection, driver distraction state detection, or driver scheduled distraction action detection,
wherein, in response to the scheduled distraction action being the smoking action, the performing driver state detection on a driver image comprises:
performing face detection on the driver image via a fourth neural network to obtain a face detection frame, and extracting feature information of the face detection frame; and
determining whether the smoking action occurs via the fourth neural network based on the feature information of the face detection frame.

27. A non-transitory computer readable storage medium having a computer program stored thereon, wherein the computer program when executed by a processor, causes the processor to perform operations, the operations comprising:
performing driver state detection on a driver image; and
performing at least one of: outputting a driving state monitoring result of a driver based on a result of the driver state detection or performing intelligent driving control based on the result of the driver state detection;

wherein the driver state detection comprises at least one of: driver fatigue state detection, driver distraction state detection, or driver scheduled distraction action detection, wherein, in response to the scheduled distraction action being the smoking action, the performing driver state detection on a driver image comprises:

performing face detection on the driver image via a fourth neural network to obtain a face detection frame, and extracting feature information of the face detection frame; and determining whether the smoking action occurs via the fourth neural network based on the feature information of the face detection frame.

* * * * *